United States Patent Office 2,743,241
Patented Apr. 24, 1956

2,743,241

PROCESS FOR BREAKING PETROLEUM EMULSIONS

Melvin De Groote, University City, Mo., assignor to Petrolite Corporation, Wilmington, Del., a corporation of Delaware No Drawing. Application November 17, 1952,
Serial No. 321,040

32 Claims. (Cl. 252—341)

This invention relates to a process for breaking petroleum emulsions of the water-in-oil type and is characterized by subjecting such an emulsion to the action of a demulsifier, including certain acidic fractional esters which are disclosed in my co-pending application S. N. 321,035, filed November 17, 1952, and which are derived by esterifying an oxyalkylated amine-modified phenol-aldehyde resin condensate with a polycarboxy acid.

Ignoring the preparation of the phenol-aldehyde resin per se the remainder of the reactions fall into three classes: (1) condensation, (2) oxyalkylation, and (3) esterification.

The acidic fractional esters obtained in the manner herein described have utility for various purposes and particularly for the resolution of petroleum emulsions of the water-in-oil type. In this connection it should be noted that the polyhydroxylated reactant or reaction mixture may be obtained by combining a comparatively large proportion of the alkylene oxide, particularly propylene oxide, or a combination of propylene oxide and ethylene oxide, with a comparatively small proportion of the resin condensate. In some instances the ratio has been as high as fifty-to-one, i. e., the ultimate product of oxyalkylation contained about 2% of resin condensate and approximately 98% alkylene oxide. This was, of course, prior to the esterification step.

Momentarily ignoring the final step of esterification this invention in a more limited aspect, as far as the reactants are concerned which, in turn, are subjected to oxyalkylation and then esterification, are as previously noted, certain amine-modified thermoplastic phenol-aldehyde resins. Subsequent description in regard to the amine-modified resins employed is largely identical with the text as it appears in certain co-pending applications, to wit, Serial No. 288,746, filed May 19, 1952, and Serial No. 301,807, filed July 30, 1952. For purpose of simplicity the invention, purely from a standpoint of the resin condensate involved, may be exemplified by an idealized formula as follows:

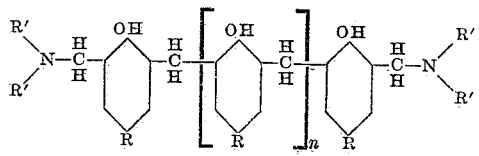

in which R represents an aliphatic hydrocarbon substituent generally having four and not over 18 carbon atoms but most preferably not over 14 carbon atoms, and n generally is a small whole number varying from 1 to 4. In the resin structure it is shown as being derived from formaldehyde although obviously other aldehydes are equally satisfactory. The amine residue in the above structure is derived from either a substituted imidazoline or a substituted tetrahydropyrimidine as previously specified and may be indicated thus:

in which

represents a reactive secondary amino group and two occurrences of R' represent the remainder of the molecule. Stated another way, what has been depicted in the above formula is an over-simplification as far as the ring compound is concerned which is obvious by reference to a more elaborate formula depicting the actual structure of typical members of the group, such as

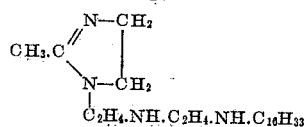

2-methyl,1-hexadecylaminoethylaminoethylimidazoline

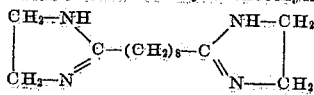

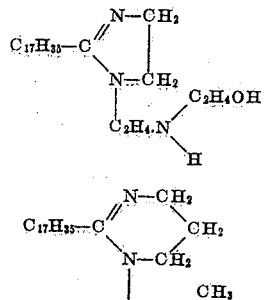

2-heptadecyl,1-methylaminoethyl tetrahydropyrimidine

The introduction of two such ring compound radicals into a comparatively small resin molecule, for instance, one having 3 to 6 phenolic nuclei as specified, alters the product in a number of ways. In the first place, a basic nitrogen atom, of course, adds a hydrophile effect; in the second place, depending on the size of the radical R', there may be a counterbalancing hydrophobe effect or one in which the hydrophobe effect more than counterbalances the hydrophile effect of the nitrogen atom. Finally, in such cases where R' contains one or more oxygen atoms, another effect is introduced, particularly another hydrophile effect. In such instances where there are hydroxyl groups present, needless to say there is a further hydrophile effect introduced.

Referring again to the resins as such, it is worth noting that combinations, either resinous or otherwise, have been prepared from phenols, aldehydes, and reactive amines particularly mono-amines.

Combinations, resinous or otherwise, have been prepared from phenols, aldehydes, and reactive amines, particularly amines having secondary amino groups. Generally speaking, such materials have fallen into three classes; the first represents non-resinous combinations derived from phenols as such; the second class represents resins which are usually insoluble and used for the purpose for which ordinary resins, particularly thermo-setting resins are adapted. The third class represents resins which are soluble as initially prepared but are not heat-stable, i. e., they are heat-convertible, which means they are not particularly suited as raw materials for subsequent chemical reaction which requires temperatures above the boiling point of water or thereabouts.

As to the preparation of the first class, i. e., non-resinous materials obtained from phenols, aldehydes and amines, particularly secondary amines, see United States Patents Nos. 2,218,739 dated October 22, 1940, to Bruson; 2,033,092 dated March 3, 1936, to Bruson; and 2,036,916 dated April 7, 1936, to Bruson.

As to a procedure by which a resin is produced as such involving all three reactants and generally resulting in an insoluble resin, or in any event, a resin which becomes insoluble in presence of added formaldehyde or the like, see United States Patents Nos. 2,341,907, dated February 15, 1944, to Cheetham et al.; 2,122,433, dated July 5, 1938, to Meigs; 2,168,335, dated August 8, 1939, to Heckert; 2,098,869, dated November 9, 1937, to Harmon et al.; and 2,211,960, dated August 20, 1940, to Meigs.

A third class of material which approaches the closest to the herein-described derivatives or resinous amino derivatives is described in U. S. Patent No. 2,031,557, dated February 18, 1936, to Bruson.

The resins employed as raw materials in the instant procedure are characterized by the presence of an aliphatic radical in the ortho or para position, i. e., the phenols themselves are difunctional phenols. This is a differentiation from the resins described in the aforementioned Bruson patent, No. 2,031,557, insofar that said patent discloses suitable resins obtained from metasubstituted phenols, hydroxybenzene, resorcinol, p,p'(dihydroxydiphenyl)dimethylmethane, and the like, all of which have at least three points of reaction per phenolic nuclei and as a result can yield resins which may be at least incipiently cross-linked even though they are apparently still soluble in oxygenated organic solvents or else are heat-reactive insofar that they may approach insolubility or become insoluble due to the effect of heat, or added formaldehyde, or both.

The resins herein employed contain only two terminal groups which are reactive to formaldehyde, i. e., they are difunctional from the standpoint of methylol-forming reactions. As is well known, although one may start with difunctional phenols, and depending on the procedure employed, one may obtain cross-linking which indicates that one or more of the phenolic nuclei have been converted from a difunctional radical to a trifunctional radical, or in terms of the resin, the molecule as a whole has a methylol-forming reactivity greater than 2. Such shift can take place after the resin has been formed or during resin formation. Briefly, an example is simply where an alkyl radical, such as methyl, ethyl, propyl, butyl, or the like, shifts from an ortho position to a meta position, or from a para position to a meta position. For instance, in the case of phenol-aldehyde varnish resins, one can prepare at least some in which the resins, instead of having only two points of reaction can have three, and possibly more points of reaction, with formaldehyde, or any other reactant which tends to form a methylol or substituted methylol group.

Apparently there is no similar limitation in regard to the resins employed in the aforementioned Bruson Patent 2,031,557, for the reason that one may prepare suitable resins from phenols of the kind already specified which invariably and inevitably would yield a resin having a functionality greater than two in the ultimate resin molecule.

The resins herein employed are soluble in a non-oxygenated hydrocarbon solvent, such as benzene or xylene. As pointed out in the aforementioned Bruson Patent 2,031,557, one of the objectives is to convert the phenol-aldehyde resins employed as raw materials in such a way as to render them hydrocarbon soluble, i. e., soluble in benzene. The original resins of U. S. Patent 2,031,557 are selected on the basis of solubility in an oxygenated inert organic solvent, such as alcohol or dioxane. It is immaterial whether the resins here employed are soluble in dioxane or alcohol, but they must be soluble in benzene.

The resins herein employed as raw materials must be comparatively low molal products having on the average 3 to 6 nuclei per resin molecule. The resins employed in the aforementioned U. S. Patent No. 2,031,557, apparently need not meet any such limitations.

The condensation products here obtained, whether in the form of the free base or the salt, do not go over to the insoluble stage on heating. This apparently is not true of the materials described in aforementioned Bruson Patent 2,031,557 and apparently one of the objectives with which the invention is concerned, is to obtain a heat-convertible condensation product. The condensation product obtained according to the present invention is heat stable and, in fact, one of its outstanding qualities is that it can be subjected to oxyalkylation, particularly oxyethylation or oxypropylation, under conventional conditions, i. e., presence of an alkaline catalyst, for example, but in any event at a temperature above 100° C. without becoming an insoluble mass.

What has been said previously in regard to heat stability, particularly when employed as a reactant for preparation of derivatives, is still important from the standpoint of manufacture of the condensation products themselves insofar that in the condensation process employed in preparing the compounds described subsequently in detail, there is no objection to the employing of a temperature above the boiling point of water. As a matter of fact, all the examples included subsequently employ temperatures going up to 140° to 150° C. If one were using resins of the kind described in U. S. Patent No. 2,031,557 it appears desirable and perhaps absolutely necessary that the temperature be kept relatively low, for instance, between 20° C. and 100° C. and more specifically at a temperature of 80° to 90° C. There is no such limitation in the condensation procedure herein described for reasons which are obvious in light of what has been said previously.

What is said above deserves further amplification at this point for the reason that it may shorten what is said subsequently in regard to the production of the herein described condensation products. As pointed out in the instant invention the resin selected is xylene or benzene soluble, which differentiates the resins from those employed in the aforementioned Bruson Patent No. 2,031,-557. Since formaldehyde generally is employed economically in an aqueous phase (30% to 40% solution, for example) it is necessary to have manufacturing procedure which will allow reactions to take place at the interface of the two immiscible liquids, to wit, the formaldehyde solution and the resin solution, on the assumption that generally the amine will dissolve in one phase or the other. Although reactions of the kind herein described will begin at least at comparatively low temperatures, for instance, 30° C., 40° C., or 50° C., yet the reaction does not go to completion except by the use of the higher temperatures. The use of higher temperatures means, of course, that the condensation product obtained at the end of the reaction must not be heat-reactive. Of course, one can add an oxygenated solvent such as alcohol, dioxane, various ethers of glycols, or the like, and produce a homogeneous phase. If this latter procedure is employed in preparing the herein described condensations it is purely a matter of convenience, but whether it is or not, ultimately the temperature must still pass within the zone indicated elsewhere, i. e., somewhere above the boiling point of water unless some obvious equivalent procedure is used.

Any reference, as in the hereto appended claims, to the procedure employed in the process is not intended to limit the method or order in which the reactants are added, commingled or reacted. The procedure has been referred to as a condensation process for obvious reasons. As pointed out elsewhere it is my preference to dissolve the resin in a suitable solvent, add the amine, and then add the formaldehyde as a 37% solution. However, all three reactants can be added in any order. I am inclined to believe that in the presence of a basic catalyst, such as the amine employed, that the formaldehyde produces methylol groups attached to the phenolic nuclei which, in turn, react with the amine. It would be immaterial, of course, if the formaldehyde reacted with the amine so as to introduce a methylol group attached to nitrogen which, in turn, would react with the resin molecule. Also, it would be immaterial if both types of compounds were formed which reacted with each other with the evolution of a mole of formaldehyde available for further reaction. Furthermore, a reaction could take place in which three different molecules are simultaneously involved although, for theoretical reasons, that is less likely. What is said herein in this respect is simply by way of explanation to avoid any limitation in regard to the appended claims.

Again it is to be emphasized that at the end of the oxyalkylation step an esterification step follows.

Whether the amines herein employed are hydroxylated or not, it is obvious the amine-modified resin is susceptible to oxyalkylation by virtue of the phenolic hydroxyl radicals. Referring to the idealized formula which appeared previously it is obvious the oxyalkylated derivatives, or at least a substantial portion of time, could be indicated in the following manner:

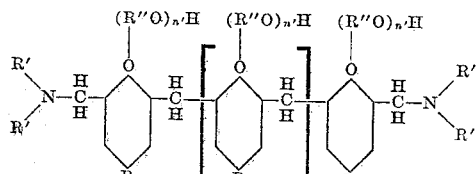

in which R″O is the radical of alkylene oxide, such as the ethoxy, propoxy or similar radicals derived from ethylene oxide, propylene oxide, glycide or the like, and $n'$ is a number varying from 1 to 50, with the proviso that one ned not oxyalkylate all the available phenolic hydroxyl radicals. In other words, one need only convert two phenolic hydroxyl radicals per resin molecule. Stated another way, $n'$ can be zero as well as a whole number subject to what has been said immediately preceding, all of which will be considered in greater detail subsequently.

Actually what has been said previously is not as complete an idealized presentation as is desirable due to another factor involved. The factor is this; since the substituted imidazoline or substituted tetrahydropyrimidine may have a hydroxyl group or a tertiary amine group which is not susceptible to oxyethylation, it may also have more than one secondary group and thus the cyclic amine residue per se may be susceptible to oxyalkylation at one or more points of reaction due to a labile hydrogen atom attached to nitrogen or attached to oxygen. Actually, it is difficult to state in general terms what the susceptibility of the secondary nitrogen group is under the conditions described for reasons which are obscure.

Briefly stated, oxyalkylation seems to take place readily at terminal secondary amino groups but less readily, and sometimes hardly at all, when the same group appears in the center of a large molecule. In the instant situation there are phenolic hydroxyl groups available which are readily susceptible to oxyalkylation and also there may be present hydroxyl groups as part of the cyclic amine residue. If one assumes for the moment the cyclic amine residue contains at least one or possibly two points of oxyalkylation susceptibility then the condensate, ignoring any attempt to show an actual ring, can be depicted more satisfactorily by first referring to the resin condensate and then to the oxyalkylated derivative.

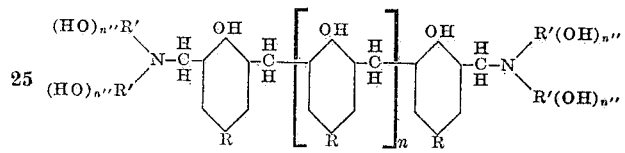

in which the characters have their previous significance, and $n''$ is the integer 0 or a small whole number, with the proviso that in each terminal amino radical there must be at least one hydroxyl group.

Thus one can show and with all propriety assume that to some extent even at the initial stage, oxyalkylation does take place in reactions of the kind described, not only at the phenolic hydroxyl but also at the hydroxyls which are part of the amino radical. This can be depicted in the following manner:

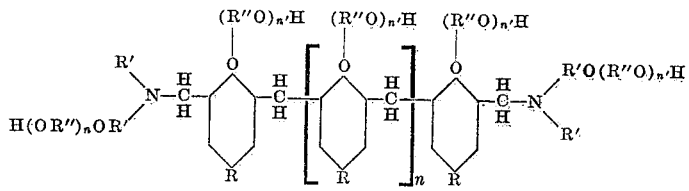

in which for simplicity the formula just shown has been limited to the specific instance where there is one oxyalkylation-susceptible hydroxyl radical present as part of the cyclic amine residue.

Assuming, however, the cyclic residue does not have a labile hydrogen attached to oxygen but does have a labile hydrogen attached to nitrogen, then the condensate derivative may be indicated thus:

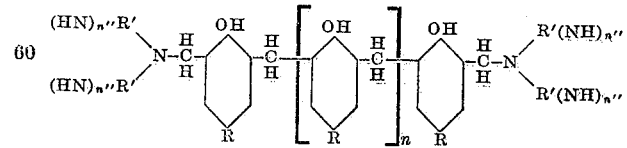

Similarly, going to the oxyalkylated product and following through the assumption just made in regard to the resin condensate the idealized formula may be presented thus:

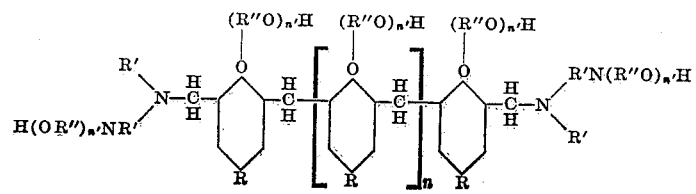

The characters in the two previous formulas have the same significance as previously and no further elaboration is required.

As stated, in the above formulas R''O is the radical of an alkylene oxide such as ethoxy, propoxy, or similar radicals derived from ethylene oxide, propylene oxide, glycide or the like, and $n'$ is a number varying from 1 to 60, with the proviso that one need not oxyalkylate all the available phenolic hydroxyl radicals or all the available amino hydrogen atoms to the extent they are present. In other words, one need convert only two labile hydrogen radicals per condensate. It is immaterial whether the labile hydrogen atoms be attached to oxygen or nitrogen.

As far as the use of the herein described products goes for the purpose of resolving petroleum emulsions of the water-in-oil type, I prefer to use those which have sufficient hydrophile character to at least meet the test set forth in U. S. Patent No. 2,499,368 dated March 7, 1950, to De Groote et al. In said patent such test for emulsification using a water-insoluble solvent, generally xylene, is described as an index of surface activity.

In the present instance the esters of the various condensation products may not necessarily be xylene-soluble although they are xylene-soluble in a large number of instances. If such compounds are not xylene-soluble the obvious chemical equivalent or equivalent chemical test can be made by simply using some suitable solvent, preferably a water-soluble solvent such as ethylene glycol diethylether, or a low molal alcohol, or a mixture to dissolve the appropriate product being examined and then mix with the equal weight of xylene, followed by addition of water. Such test is obviously the same for the reason that there will be two phases on vigorous shaking and surface activity makes its presence manifest. It is understood the reference in the hereto appended claims as to the use of xylene in the emulsification test includes such obvious variant.

Reference is again made to U. S. Patent 2,499,368 dated March 7, 1950, to De Groote and Keiser. In said immediately aforementioned patent the following test appears:

"The same is true in regard to the oxyalkylated resins herein specified, particularly in the lower stage of oxyalkylation, the so-called 'sub-surface-active' stage. The surface-active properties are readily demonstrated by producing a xylene-water emulsion. A suitable procedure is as follows: The oxyalkylated resin is dissolved in an equal weight of xylene. Such 50–50 solution is then mixed with 1–3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the products used in accordance with this invention. They dissolve or disperse in water; and such dispersions foam readily. With borderline cases, i. e., those which show only incipent hydrophile or surface-active property (sub-surface-activity) tests for emulsifying properties or self-dispersibility are useful. The fact that a reagent is capable of producing a dispersion in water is proof that it is distincty hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

Having described the invention briefly and not necessarily in its most complete aspect, the text immediately following will be a more complete description with specific reference to reagents and the method of manufacture.

For convenience the subsequent text will be divided into six parts:

Part 1 is concerned with the general structure of the amine-modified resin condensates and also the resin itself, which is used as a raw material;

Part 2 is concerned with appropriate cyclic amidines selected from the class consisting of substituted imidazolines and substituted tetrahydropyrimidines in which there is present at least one basic secondary amino radical and characterized by freedom from any primary amino radical;

Part 3 is concerned with the condensation reactions involving the resin, the amine, and formaldehyde to produce the specific products or compounds;

Part 4 is concerned with the oxyalkylation of the products described in Part 3, preceding;

Part 5 is concerned with the conversion of the polyhydroxylated compounds or reaction mixtures described in Part 4 preceding, into acidic fractional esters by means of polycarboxy acids; and Part 6 is concerned with the resolution of petroleum emulsions of the water-in-oil type by means of the acidic fractional esters previously described.

In the subsequent text, Parts 1, 2 and 3 appear in substantially the same form as the text of the aforementioned co-pending application, Serial No. 288,746, filed May 19, 1952, and also in aforementioned co-pending application, Serial No. 301,807, filed July 30, 1952. Part 4 is substantially the same as Part 4 as it appears in the last mentioned co-pending application. The text is so presented for both purpose of convenience and comparison. Similarly, Part 5 is substantially the same as it appears in aforementioned co-pending application, Serial No. 321,035, filed November 17, 1952.

PART 1

It is well known that one can readily purchase on the open market, or prepare fusible, organic solvent-soluble, water-insoluble resin polymers of a composition approximated in an idealized form by the formula

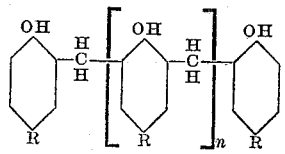

In the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents an aliphatic hydrocarbon substituent, generally an alkyl radical having from 4 to 14 carbon atoms, such as a butyl, amyl, hexyl, decyl or dodecyl radical. Where the divalent bridge radical is shown as being derived from formaldehyde it may, of course, be derived from any other reactive aldehyde having 8 carbon atoms or less.

Because a resin is organic solvent-soluble does not mean it is necessarily soluble in any organic solvent. This is particularly true where the resins are derived from trifunctional phenols as previously noted. However, even when obtained from a difunctional phenol, for instance para-phenylphenol, one may obtain a resin which is not soluble in a nonoxygenated solvent, such as benzene, or xylene, but requires an oxygenated solvent such as a low molal alcohol, dioxane, or diethylglycol diethylether. Sometimes a mixture of the two solvents (oxygenated and nonoxygenated) will serve. See Example 9a of U. S. Patent No. 2,499,365, dated March 7, 1950, to De Groote and Keiser.

The resins herein employed as raw materials must be soluble in a nonoxygenated solvent, such as benzene or xylene. This presents no problem insofar that all that is required is to make a solubility test on commercially available resins or else prepare resins which are xylene or benzene-soluble as described in aforementioned U. S. Patent No. 2,499,365, or in U. S. Patent No. 2,499,368 dated March 7, 1950, to De Groote and Keiser. In said patent there are described oxyalkylation-susceptible, fusible, nonoxygenated-organic solvent-soluble, water-insoluble, low-stage phenol-aldehyde resins having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of tri-functional phenols; said phenol being of the formula

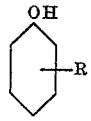

in which R is an aliphatic hydrocarbon radical having at least 4 carbon atoms and not more than 24 carbon atoms, and substituted in the 2,4,6 position.

If one selected a resin of the kind just described previously and reacted approximately one mole of the resin with two moles of formaldehyde and two moles of a basic nonhydroxylated secondary amine as specified, following the same idealized over-simplification previously referred to, the resultant product might be illustrated thus:

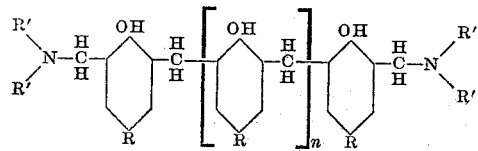

The basic amine may be designated thus:

subject to what has been said previously as to the presence of a substituted imidazoline or a substituted tetrahydropyrimidine radical having at least one basic secondary amino radical present and that the ring compound, or rather the two occurrences of R' jointly with H, be free from a primary amine radical. However, if one attempts to incorporate into the formula

a structure such as a substituted imidazoline or substituted tetrahydropyrimidine such as the following:

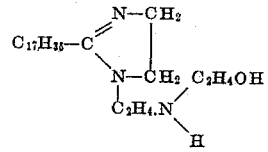

then one becomes involved in added difficulties in presenting an overall picture. Thus, for sake of simplicity the ring compound having the reactive secondary amino group will be depicted as

subject to the limitation and explanation previously noted.

In conducting reactions of this kind one does not necessarily obtain a hundred per cent yield for obvious reasons. Certain side reactions may take place. For instance, 2 moles of amine may combine with one mole of the aldehyde, or only one mole of the amine may combine with the resin molecule, or even to a very slight extent, if at all, 2 resin units may combine without any amine in the reaction product, as indicated in the following formula:

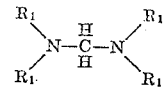

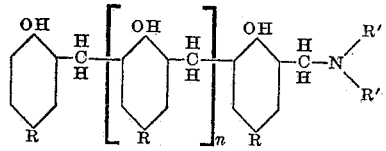

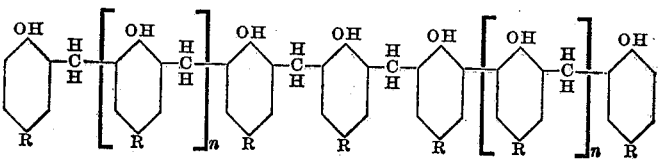

As has been pointed out previously, as far as the resin unit goes one can use a mole of aldehyde other than formaldehyde, such as acetaldehyde, propionaladeahyde or butyraldehyde. The resin unit may be exemplified thus:

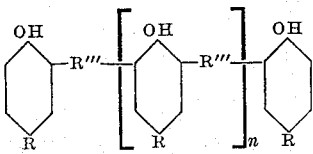

in which R''' is the divalent radical obtained from the particular aldehyde employed to form the resin. For reasons which are obvious the condensation product obtained appears to be described best in terms of the method of manufacture.

As previously stated the preparation of resins, the kind herein employed as reactants, is well known. See previously mentioned U. S. Patent 2,499,368. Resins can be made using an acid catalyst or basic catalyst or a catalyst having neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although I have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5, 4.5 or 5.2.

In the actual manufacture of the resins I found no reason for using other than those which are lowest in price and most readily availiable commercially. For purposes of convenience suitable resins are characterized in the following table:

TABLE I

| Ex. No. | R | Position of R | R''' derived from— | $n$ | Mol. wt. of resin molecule |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclohexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |

PART 2

The expression "cyclic amidines" is employed in its usual sense to indicate ring compounds in which there are present either 5 members or 6 members, and having 2 nitrogen atoms separated by a single carbon atom supplemented by either two additional carbon atoms or three additional carbon atoms completing the ring. All the carbon atoms may be substituted. The nitrogen atom of the ring involving two monovalent linkages may be substituted. Needless to say, these compounds include members in which the substituents also may have one or more nitrogen atoms, either in the form of amino nitrogen atoms or in the form of acylated nitrogen atoms.

These cyclic amidines are sometimes characterized as being substituted imidazolines and tetrahydropyrimidines in which the two-position carbon of the ring is generally bonded to a hydrocarbon radical or comparable radical derived from an acid, such as a low molal fatty acid, a high molal fatty acid, or comparable acids such as polycarboxy acids.

Cyclic amidines obtained from oxidized wax acids are described in detail in co-pending Blair application, Serial No. 274,075, filed February 28, 1952, now Patent No. 2,693,468 dated November 2, 1954. Instead of being derived from oxidized wax acids, the cyclic compounds herein employed may be obtained from any acid from acetic acid upward, and may be obtained from acids, such as benzoic, or acids in which there is a reoccurring ether linkage in the acyl radical. In essence then, with this difference said aforementioned co-pending Blair application, Serial No. 274,075, describes compounds of the following structure:

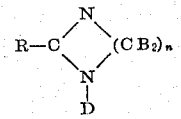

where R is a member of the class consisting of hydrocarbon radicals having up to approximately 30 carbon atoms and includes hydroxylated hydrocarbon radicals and also hydrocarbon radicals in which the carbon atom chain is interrupted by oxygen; $n$ is the numeral 2 to 3, D is a member of the class consisting of hydrogen and organic radicals containing less than 25 carbon atoms, composed of the elements from the group consisting of C, N, O and H, and B is a member of the group consisting of hydrogen and hydrocarbon radicals containing less than 7 carbon atoms, with the proviso that at least three occurrences of B are hydrogen.

The preparation of an imidazoline substituted in the two-position by lower aliphatic hydrocarbon radicals is described in the literature and is readily carried out by reaction between a monocarboxylic acid or ester or amide and a diamine or polyamine, containing at least one primary amino group, and at least one secondary amino group or a second primary amino group separated from the first primary amino group by two carbon atoms.

Examples of suitable polyamines which can be employed as reactants to form basic nitrogen-containing compounds of the present invention include polyalkylene polyamines such as ethylene-diamine, diethylenetriamine, triethylenetetramine, tetraethylenepentamine, and higher polyethylene polyamines, and also including 1,2-diaminopropane, N-ethylethylenediamine, N,N-dibutyldiethylenetriamine, 1,2-diaminobutane, hydroxyethylethylenediamine, 1,2-propylenetriamine, and the like.

For details of the preparation of imidazolines substituted in the 2-position from amines of this type, see the following U. S. patents: U. S. No. 1,999,989 dated April 30, 1935, Max Bockmuhl et al.; U. S. No. 2,155,877 dated April 25, 1939, Edmund Waldmann et al.; and U. S. No. 2,155,878 dated April 25, 1939, Edmund Waldmann et al., also see Chem. Rev., 32, 47 (43).

Equally suitable for use in preparing compounds of my invention and for the preparation of tetrahydropyrimidines substituted in the 2-position are the polyamines containing at least one primary amino group and at least one secondary amino group, or another primary amino group separated from the first primary amino group by three carbon atoms. This reaction is generally carried out by heating the reactants to a temperature of 230° C. or higher, usually within the range of 250° C. to 300° C., at which temperatures water is evolved and ring closure is effected. For details of the preparation of tetrahydropyrimidines, see German Patent No. 700,371 dated December 18, 1940, to Edmund Waldmann and August Chwala; German Patent No. 701,322 dated January 14, 1941, to Karl Kiescher, Ernst Erech and Willi Klarer; and U. S. Patent No. 2,194,419 dated March 19, 1940, to August Chwala.

Examples of amines suitable for this synthesis include 1,3-propylenediamine, trimethylenediamine, 1,3-diaminobutane, 2,4-diaminopentane, M-ethyl-trimethylenediamine, N-aminoethyltrimethylene diamine, aminopropyl stearylamine, tripropylenetramine, tetrapropylenepentamine, high boiling polyamines prepared by the condensation of 1,3-propylene dichloride with ammonia, and similar diamines or polyamines in which there occurs at least one primary amino group separated from another primary or secondary amino group by three carbon atoms.

Similarly, the same class of materials are included as initial reactants in co-pending Smith application, Serial No. 281,645, filed April 10, 1952, now Patent No. 2,713,559 dated July 19, 1955. Said application in essence states that the cyclic compounds employed may be derived from either polyamines in which the nitrogen atoms are separated by an ethylene radical or by a trimethylene radical. Reference to a propylene radical means a methyl substituted ethylene radical, i. e., having only 2 carbon atoms between nitrogen atoms. From a practical standpoint, as will be explained hereinafter, the polyethylene imidazolines are most readily available and most economical for use. Thus, broadly speaking, using the same terminology as said Smith application, Serial No. 281,645, the present invention is concerned with a condensation reaction, in which one class of reactants are substituted ring compounds consisting of

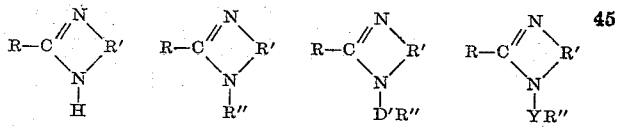

in which R′ is a divalent alkylene radical selected from the class consisting of $$-CH_2CH_2-$$

$$-CH_2CH_2CH_2-$$

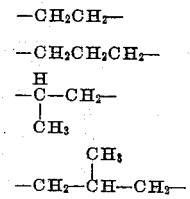

and in which D′ represents a divalent, non-amino, organic radical containing less than 25 carbon atoms, composed of elements from the group consisting of C, H, O, and n; Y represents a divalent, organic radical containing less than 25 carbon atoms, composed of elements from the group consisting of C, H, O, and N, and containing at least one amino group, and R is a member of the class consisting of hydrogen, aliphatic hydrocarbon radicals, hydroxylated aliphatic hydrocarbon radicals, cycloaliphatic hydrocarbon radicals, and hydroxylated cycloaliphatic hydrocarbon radicals; R″ is a member of the class consisting of hydrogen, aliphatic radicals and cycloaliphatic radicals, with the proviso that in the occurrence of the radicals R and R″ there be present at least one group of 8 to 32 uninterrupted carbon atoms. In the present instance, however, there is no limitation in regard to the radicals R and R″.

What has been said previously in regard to the two above copending applications as far as substituted imidazolines are concerned is substantially the same as appears in Blair and Gross Reissue Patent No. 23,227, reissued May 9, 1950, and Monson Patent No. 2,589,198 dated April 11, 1952.

As to the six-membered ring compounds generally referred to as substituted pyrimidines, and more particularly as substituted tetrahydropyrimidines, see U. S. Patent No. 2,534,828 dated December 19, 1950, to Mitchell et al. With the modification as far as the instant application goes, the hydrocarbon group R may have the same variation as when it is part of the five-membered ring previously referred to and is not limited to an alkyl group having at least 10 carbon atoms as in the instance of the aforementioned U. S. Patent No. 2,534,828.

For the purpose of the present invention there is selected from the broad case of compounds previously described such members as meet the following limitations: (a) Have present at least one basic secondary amino radical; and (b) be free from primary amino groups and especially basic primary amino groups. Such compounds may have two-ring membered radicals present instead of one ring-membered radical and may or many not have present a tertiary amine radical or a hydroxyl radical, such as a hydroxy alkyl radical. A large number of compounds have been described in the literature meeting the above specifications, of which quite a few appear in the aforementioned issued U. S. patents. Examples selected from the patents include the following:

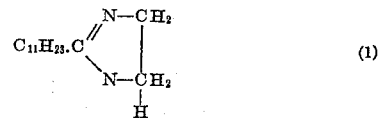

2-undecylimidazoline

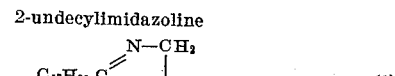

2-heptadecylimidazoline

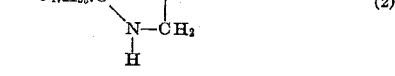

2-oleylimidazoline

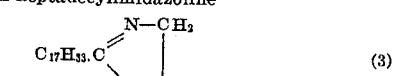

1-N-decylaminoethyl,2-ethylimidazoline

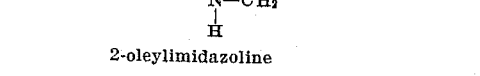

2-methyl,1-hexadecylaminoethylaminoethylimidazoline

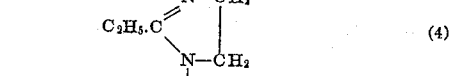

1-dodecylaminopropylimidazoline

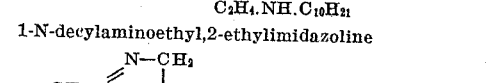

1-(stearoyloxyethyl)aminoethylimidazoline

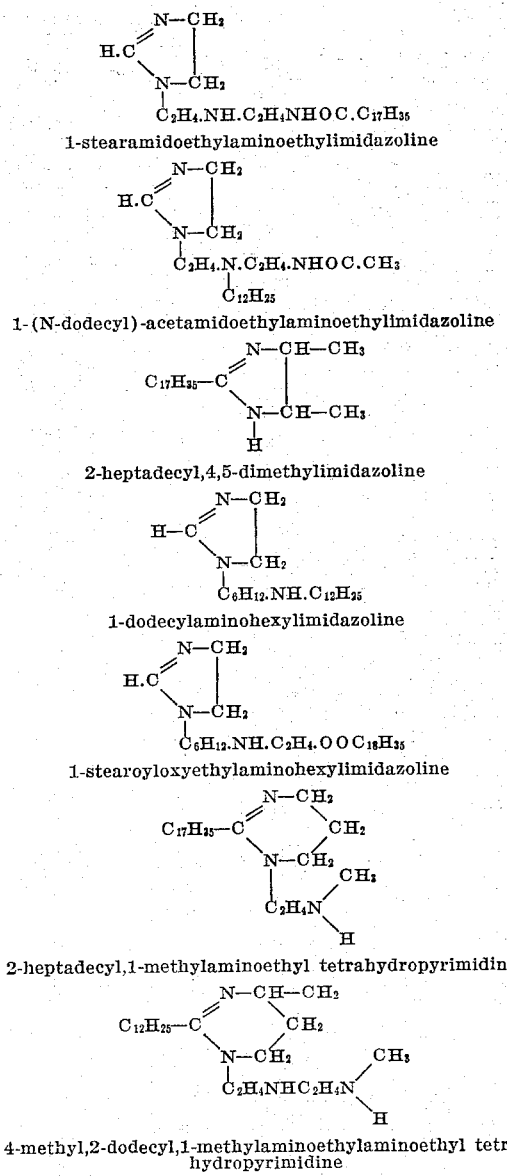

As has been pointed out previously, the reactants herein employed may have two substituted imidazoline rings or two substituted tetrahydropyrimidine rings. Such compounds are illustrated by the following formula

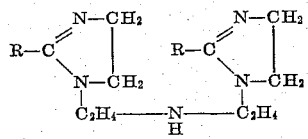

Such compounds can be derived, of course, from triethylenetetramine, tetraethylenepentamine, pentaethylenehexamine, and higher homologues. The substituents may vary depending on the source of the hydrocarbon radical, such as the lower fatty acids and higher fatty acids, a resin acid, naphthenic acid, or the like. The group introduced may or may not contain a hydroxyl radical as in the case of hydroxyacetic acid, acetic acid, ricinoleic acid, oleic acid, etc.

One advantage of a two-ring compound resides in the fact that primary amino groups which constitute the terminal radicals of the parent polyamine, whether a polyethylene amine or polypropylene amine, are converted so as to eliminate the presence of such primary amino radicals. Thus, the two-membered ring compound meets the previous specification in regard to the nitrogen-containing radicals.

Another procedure to form a two-membered ring compound is to use a dibasic acid. Suitable compounds are described, for example, in aforementioned U. S. Patent No. 2,194,419, dated March 19, 1940, to Chwala.

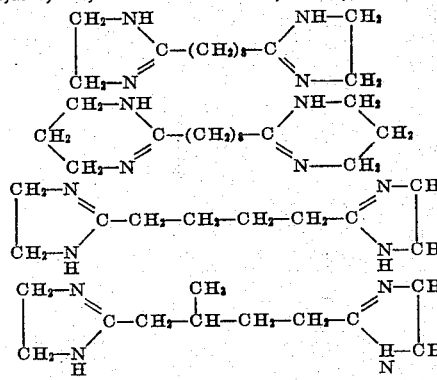

As to compounds having a tertiary amine radical, it is obvious that one can employ derivatives of polyamines in which the terminal groups are unsymmetrically alkylated. Initial polyamines of this type are illustrated by the following formula

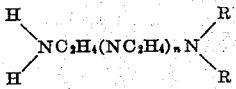

in which R represents a small alkyl radical such as methyl, ethyl, propyl, etc., and $n$ represents a small whole number greater than unity such as 2, 3 or 4. Substituted imidazolines can only be formed from that part of the polyamine which has a primary amino group present. There is no objection to the presence of a tertiary amine radical as previously pointed out. Such derivatives, provided there is more than one secondary amino radical present in the ring compound, may be reacted with an alkylene oxide, such as ethylene oxide, propylene oxide, glycide, etc., so as to convert one or more amino nitrogen radicals into the corresponding hydroxy alkyl radical, provided, however, that there is still a residual secondary amine group. For instance, in the preceding formula if $n$ represents 4 it means the ring compound would have two secondary nitrogen radicals and could be treated with a single mole of an alkylene oxide and still provide a satisfactory reactant for the herein described condensation reaction.

Ring compounds, such as substituted imidazolines, may be reacted with a substantial amount of alkylene oxide as noted in the preceding paragraph and then a secondary amino group introduced by two steps; first, reaction with an ethylene imine, and second, reaction with another mole of the oxide, or with an alkylating agent such as dimethyl sulfate, benzyl chloride, a low molal ester of a sulfonic acid, an alkyl bromide, etc.

As to oxyalkylated imidazolines and a variety of suitable high molecular weight carboxy acids which may be the source of a substituent radical, see U. S. Patent No. 2,468,180, dated April 26, 1949, to De Groote and Keiser.

Other suitable means may be employed to eliminate a terminal primary amino radical. If there is additionally a basic secondary amino radical present then the primary amino radical can be subjected to acylation notwithstanding the fact that the surviving amino group has no significant basicity. As a rule acylation takes place at the terminal primary amino group rather than at the secondary amino group, thus one can employ a compound such as

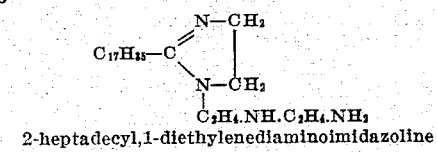

and subject it to acylation so as to obtain, for example, acetylated 2-heptadecyl,1-diethylenediaminoimidazoline of the following structure:

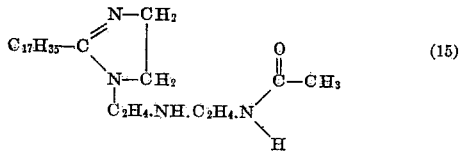 (15)

Similarly, a compound having no basic secondary amino radical but a basic primary amino radical can be reacted with a mole of an alkylene oxide, such as ethylene oxide, propylene oxide, glycide, etc., to yield a perfectly satisfactory reactant for the herein described condensation procedure. This can be illustrated in the following manner by a compound such as

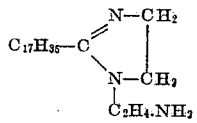

2-heptadecyl,1-aminoethylimidazoline which can be reacted with a single mole of ethylene oxide, for example, to produce the hydroxy ethyl derivative of 2-heptadecyl,1-aminoethylimidazoline, which can be illustrated by the following formula:

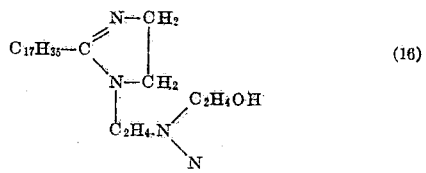 (16)

Other reactants may be employed in connection with an initial reactant of the kind described above, to wit, 2-heptadecyl,1-aminoethylimidazoline; for instance, reaction with an alkylene imine such as ethylene imine, propylene imine, etc. If reacted with ethylene imine the net result is to convert a primary amino radical into a secondary amino radical and also introduces a new primary amino group. If ethylene imine is employed, the net result is simply to convert 2-heptadecyl,1-aminoethylimidazoline into 2-heptadecyl,1-diethylenediaminoimidazoline. However, if propylene imine is used the net result is a compound which can be considered as being derived hypothetically from a mixed polyalkylene amine, i. e., one having both ethylene groups and a propylene group between nitrogen atoms.

A more satisfactory reactant is to employ one obtained by the reaction of epichlorohydrin on a secondary alkyl amine, such as the following compound:

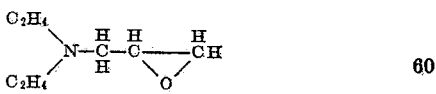

If a mole of 2-heptadecyl,1-aminoethylimidazoline is reacted with a mole of the compound just described, to wit,

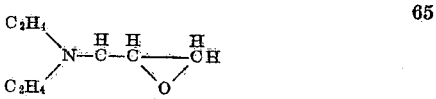

the resultant compound has a basic secondary amino group and a basic tertiary amino group. See U. S. Patent No. 2,520,093 dated August 22, 1950, to Gross.

For purpose of convenience, what has been said by direct reference is largely by way of illustration in which there is present a sizable hydrophobe group, for instance, heptadecyl groups, pentadecyl groups, octyl groups, nonyl groups, etc. etc.

As has been pointed out, one can obtain all these comparable derivatives from low molal acids, such as acetic, propionic, butyric, valeric, etc. Similarly, one can employ hydroxy acids such as glycolic acids, lactic acid, etc. Over and above this, one may employ acids which introduce a very distinct hydrophobe effect as, for example, acids prepared by the oxyethylation of a low molal alcohol, such as methyl, ethyl, propyl, or the like, to produce compounds of the formula $$R(OCH_2CH_2)_nOH$$

in which R is a low molal group, such as methyl, ethyl or propyl, and $n$ is a whole number varying from one up to 15 or 20. Such compounds can be converted into the alkoxide and then reacted with an ester of chloroacetic, followed by saponification so as to yield compounds of the type $R(OCH_2CH_2)_nOCH_2COOH$ in which $n$ has its prior significance. Another procedure is to convert the compound into a halide ether such as in $$R(OCH_2CH_2)_nCl$$

in which $n$ has its prior significance, and then react such halide either with sodium cyanide so as to give the corresponding nitrile, $R(OCH_2CH_2)_nCN$, which can be converted into the corresponding acid, of the following composition $R(OCH_2CH_2)_nCOOH$. Such acids can also be used to produce acyl derivatives of the kind previously described in which acetic acid is used as an acylating agent.

What has been said above is intended to emphasize the fact that the nitrogen compounds herein employed can vary from those which are strongly hydrophobe in character and have a minimum hydrophobe property, to those which are essentially hydrophile in character and have only a very minimum hydrophobe property.

Examples of decreased hydrophobe character are exemplified by 2-methylimidazoline, 2-propylimidazoline, and 2-butylimidazoline, of the following structures:

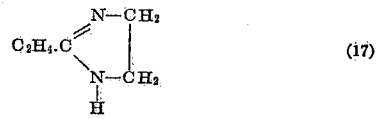 (17)

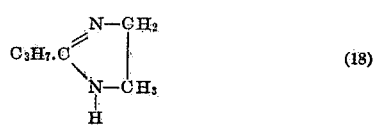 (18)

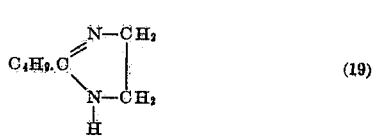 (19)

PART 3

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

Previous reference has been made to the fact that the procedure herein employed is comparable, in a general way, to that which corresponds to somewhat similar derivatives made either from phenols as differentiated from a resin, or in the manufacture of a phenol-amine-aldehyde resin; or else from a particularly selected resin and an amine and formaldehyde in the manner described in Bruson Patent No. 2,031,557 in order to obtain a heat-reactive resin. Since the condensation products obtained are not heat-convertible and since manufacture is not restricted to a single phase system, and since temperatures up to 150° C. or thereabouts may be employed, it is obvious that the procedure becomes comparatively simple. Indeed, perhaps no description is necessary over and above what has been said previously, in light of subsequent examples. However, for purpose of clarity the following details are included.

A convenient piece of equipment for preparation of these cogeneric mixtures is a resin pot of the kind described in aforementioned U. S. Patent No. 2,499,368. In most instances the resin selected is not apt to be a fusible liquid at the early or low temperature stage of reaction if employed as subsequently described; in fact, usually it is apt to be a solid at distinctly higher temperatures, for instance, ordinary room temperature. Thus, I have found it convenient to use a solvent and particularly one which can be removed readily at a comparatively moderate temperature, for instance, at 150° C. A suitable solvent is usually benzene, xylene, or a comparable petroleum hydrocarbon or a mixture of such or similar solvents. Indeed, resins which are not soluble except in oxygenated solvents or mixtures containing such solvents are not here included as raw materials. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively non-volatile solvent such as dioxane or the diethylether of ethylene glycol. One can also use a mixture of benzene or xylene and such oxygenated solvents. Note that the use of such oxygenated solvent is not required in the sense that it is not necessary to use an initial resin which is soluble only in an oxygenated solvent as just noted, and it is not necessary to have a single phase system for reaction.

Actually, water is apt to be present as a solvent for the reason that in most cases aqueous formaldehyde is employed, which may be the commercial product which is approximately 37%, or it may be diluted down to about 30% formaldehyde. However, paraformaldehyde can be used but it is more difficult perhaps to add a solid material instead of the liquid solution and, everything else being equal, the latter is apt to be more economical. In any event, water is present as water of reaction. If the solvent is completely removed at the end of the process, no problem is involved if the material is used for any subsequent reaction. However, if the reaction mass is going to be subjected to some further reaction where the solvent may be objectionable, as in the case of ethyl or hexyl alcohol, and if there is to be subsequent oxyalkylation, then, obviously, the alcohol should not be used or else it should be removed. The fact that an oxygenated solvent need not be employed, of course, is an advantage for reasons stated.

Another factor, as far as the selection of solvent goes, is whether or not the cogeneric mixture obtained at the end of the reaction is to be used as such or in the salt form. The cogeneric mixtures obtained are apt to be solids or thick viscous liquids in which there is some change from the initial resin itself, particularly if some of the initial solvent is apt to remain without complete removal. Even if one starts with a resin which is almost water-white in color, the products obtained are almost invariably a dark red in color or at least a red-amber, or some color which includes both an amber component and a reddish component. By and large, the melting point is apt to be lower and the products may be more sticky and more tacky than the original resin itself. Depending on the resin selected and on the amine selected the condensation product or reaction mass on a solvent-free basis may be hard, resinous and comparable to the resin itself.

The products obtained, depending on the reactants selected, may be water-insoluble or water-dispersible, or water-soluble, or close to being water-soluble. Water solubility is enhanced, of course, by making a solution in the acidified vehicle such as a dilute solution, for instance, a 5% solution of hydrochloric acid, acetic acid, hydroxyacetic acid, etc. One also may convert the finished product into salts by simply adding a stoichiometric amount of any selected acid and removing any water present by refluxing with benzene or the like. In fact, the selection of the solvent employed may depend in part whether or not the product at the completion of the reaction is to be converted into a salt form.

In the next succeeding paragraph it is pointed out that frequently it is convenient to eliminate all solvent, using a temperature of not over 150° C. and employing vacuum, if required. This applies, of course, only to those circumstances where it is desirable or necessary to remove the solvent. Petroleum solvents, aromatic solvents, etc., can be used. The selection of solvent, such as benzene, xylene, or the like, depends primarily on cost, i. e., the use of the most economical solvent and also on three other factors, two of which have been previously mentioned; (a) is the solvent to remain in the reaction mass without removal? (b) is the reaction mass to be subjected to further reaction in which the solvent, for instance, an alcohol, either low boiling or high boiling, might interfere as in the case of oxyalkylation?; and the third factor is this, (c) is an effort to be made to purify the reaction mass by the usual procedure as, for example, a water-wash to remove the water-soluble unreacted formaldehyde, if any, or a water-wash to remove any unreacted water-soluble cyclic amidine, if employed and present after reaction? Such procedures are well known and, needless to say, certain solvents are more suitable than others. Everything else being equal, I have found xylene the most satisfactory solvent.

I have found no particular advantage in using a low temperature in the early stage of the reaction because, and for reasons explained, this is not necessary, although it does apply in some other procedures that, in a general way, bear some similarity to the present procedure. There is no objection, of course, to giving the reaction an opportunity to proceed as far as it will at some low temperature, for instance, 30° to 40° but ultimately one must employ the higher temperature in order to obtain products of the kind herein described. If a lower temperature reaction is used initially the period is not critical, in fact, it may be anything from a few hours up to 24 hours. I have not found any case where it was necessary or even desirable to hold the low temperature stage for more than 24 hours. In fact, I am not convinced there is any advantage in holding it at this stage for more than 3 or 4 hours at the most. This, again, is a matter of convenience largely for one reason. In heating and stirring the reaction mass there is a tendency for formaldehyde to be lost. Thus, if the reaction can be conducted at a lower temperature so as to use up part of the formaldehyde at such lower temperature, then the amount of unreacted formaldehyde is decreased subsequently and makes it easier to prevent any loss. Here, again, this lower temperature is not necessary by virtue of heat convertibility as previously referred to.

If solvents and reactants are selected so the reactants and products of reaction are mutually soluble, then agitation is required only to the extent that it helps cooling or helps distribution of the incoming formaldehyde. This mutual solubility is not necessary as previously pointed out but may be convenient under certain circumstances. On the other hand, if the products are not mutually soluble then agitation should be more vigorous for the reason that reaction probably takes place principally at the interfaces and the more vigorous the agitation the more interfacial area. The general procedure employed is invariably the same when adding the resin and the selected solvent, such as benzene or xylene. Refluxing should be long enough to insure that the resin added, preferably in a powdered form, is completely soluble. However, if the resin is prepared as such it may be added in solution form, just as preparation is described in aforementioned U. S. Patent 2,499,368. After the resin is in complete solution the cyclic amidine is added and stirred. Depending on the polyamine selected, it may or may not be soluble in the resin solution. If it is not soluble in the resin solution it may be soluble in the aqueous formaldehyde solution. If so, the resin then will dissolve in the formaldehyde solution as added, and if not, it is even possible that the initial reaction mass could be a three-phase system instead of a two-phase system although this would be extremely unusual. This solution, or mechanical mixture, if not completely soluble is cooled to at least the reaction temperature or somewhat below, for example 35° C. or slightly lower, provided this initial low temperature stage is employed. The formaldehyde is then added in a suitable form. For reasons pointed out I prefer to use a solution and whether to use a commercial 37% concentration is simply a matter of choice. In large scale manufacturing there may be some advantage in using a 30% solution of formaldehyde but apparently this is not true on a small laboratory scale or pilot plant scale. 30% formaldehyde may tend to decrease any formaldehyde loss or make it easier to control unreacted formaldehyde loss.

On a large scale if there is any difficulty with formaldehyde loss control, one can use a more dilute form of formaldehyde, for instance, a 30% solution. The reaction can be conducted in an autoclave and no attempt made to remove water until the reaction is over. Generally speaking, such a procedure is much less satisfactory for a number of reasons. For example, the reaction does not seem to go to completion, foaming takes place, and other mechanical or chemical difficulties are involved. I have found no advantage in using solid formaldehyde because even here water of reaction is formed.

Returning again to the preferred method of reaction and particularly from the standpoint of laboratory procedure employing a glass resin pot, when the reaction has proceeded as one can reasonably expect at a low temperature, for instance, after holding the reaction mass with or without stirring, depending on whether or not it is homogeneous, at 30° or 40° C. for 4 or 5 hours, or at the most, up to 10–24 hours, I then complete the reaction by raising the temperature up to 150° C., or thereabouts as required. The initial low temperature procedure can be eliminated or reduced to merely the shortest period of time which avoids loss of cyclic amidine or formaldehyde. At a higher temperature I use a phase-separating trap and subject the mixture to reflux condensation until the water of reaction and the water of solution of the formaldehyde is eliminated. I then permit the temperature to rise to somewhere about 100° C., and generally slightly above 100° C., and below 150° C., by eliminating the solvent or part of the solvent so the reaction mass stays within this predetermined range. This period of heating and refluxing, after the water is eliminated, is continued until the reaction mass is homogeneous and then for one to three hours longer. The removal of the solvents is conducted in a conventional manner in the same way as the removal of solvents in resin manufacture as described in aforementioned U. S. Patent No. 2,499,368.

Needless to say, as far as the ratio of reactants goes I have invariably employed approximately one mole of the resin based on the molecular weight of the resin molecule, 2 moles of the selected cyclic amidine and 2 moles of formaldehyde. In some instances I have added a trace of caustic as an added catalyst but have found no particular advantage in this. In other cases I have used a slight excess of formaldehyde and, again, have not found any particular advantage in this. In other cases I have used a slight excess of nitrogen compound and, again, have not found any particular advantage in so doing. Whenever feasible I have checked the completeness of reaction in the usual ways, including the amount of water of reaction, molecular weight, and particularly in some instances have checked whether or not the end-product showed surface-activity, particularly in a dilute acetic acid solution. The nitrogen content after removal of unreacted polyamine, if any is present, is another index.

In light of what has been said previously, little more need be said as to the actual procedure employed for the preparation of the herein described condensation products. The following example will serve by way of illustration:

*Example 1b*

The phenol-aldehyde resin is the one that has been identified previously as Example 2a. It was obtained from a paratertiary butyl phenol and formaldehyde. The resin was prepared using an acid catalyst which was completely neutralized at the end of the reaction. The molecular weight of the resin was 882.5. This corresponded to an average of about 3½ phenolic nuclei, as the value for $n$ which excludes the 2 external nuclei, i. e., the resin was largely a mixture having 3 nuclei and 4 nuclei, excluding the 2 external nuclei, or 5 and 6 overall nuclei. The resin so obtained in a neutral state had a slight amber color.

882 grams of the resin identified as 2a, preceding, were powdered and mixed with a somewhat lesser amount of xylene, i. e., 600 grams. The mixture was refluxed until solution was complete. It was then adjusted to approximately 35° C. and 612 grams of 2-oleylimidazoline, previously shown in a structural formula as ring compound (3), were added. The mixture was stirred vigorously and formaldehyde added slowly. In this particular case the formaldehyde used was a 37% solution and 162 grams were added in approximately 3 hours. The mixture was stirred vigorously and kept within a range of approximately 40° to 44° C., for about 16½ hours. At the end of this time it was refluxed, using a phase-separating trap and a small amount of aqueous distillate withdrawn from time to time. The presence of unreacted formaldehyde was noted. Any unreacted formaldehyde seemed to disappear in approximately three hours after refluxing started. As soon as the odor of formaldehyde was no longer detectible the phase-separating trap was set so as to eliminate all the water of solution and reaction. After the water was eliminated part of the xylene was removed until the temperature reached approximately 148° C. The mass was kept at this higher temperature for 3 or 4 hours. During this time any additional water, which was probably water of reaction which had formed, was eliminated by means of the trap. The residual xylene was permitted to stay in the cogeneric mixture. A small amount of the sample was heated on a water bath to remove the excess xylene. The residual material was dark red in color and had the consistency of a thick sticky fluid or tacky resin. The overall reaction time was approximately 30 hours. In other examples it varied from as little as 24 hours up to approximately 38 hours. The time can be reduced by cutting the low temperature period to approximately 3 to 6 hours. Note that in Table II following there are a large number of added examples illustrating the same procedure. In each case the initial mixture was stirred and held at a fairly low temperature (30° to 40° C.) for a period of several hours. Then refluxing was employed until the odor of formaldehyde disappeared. After the odor of formaldehyde disappeared the phase-separating trap was employed to separate out all the water, both the solution and condensation. After all the water had been separated enough xylene was taken out to have the final product reflux for several hours somewhere in the range of 145° to 150° C., or thereabouts. Usually the mixture yielded a clear solution by the time the bulk of the water, or all of the water, had been removed.

Note that as pointed out previously, this procedure is illustrated by 24 examples in Table II.

TABLE II

| Ex. No. | Resin used | Amt., grs. | Amine used | Amt. of amine, grams | Strength of formaldehyde soln. and amt. | Solvent used and amt. | Reaction temp., °C. | Reaction time (hrs.) | Max. distill. temp., °C. |
|---|---|---|---|---|---|---|---|---|---|
| 1b | 2a | 882 | Amine 3 | 612 | 37%, 162 g | Xylene, 600 g | 30-25 | 30 | 148 |
| 2b | 5a | 480 | do | 306 | 37%, 81 g | Xylene, 450 g | 21-23 | 24 | 145 |
| 3b | 10a | 633 | do | 306 | 37%, 81 g | Xylene, 600 g | 20-22 | 28 | 150 |
| 4b | 2a | 441 | Amine 4 | 281 | 30%, 100 g | Xylene, 400 g | 22-24 | 28 | 148 |
| 5b | 5a | 480 | do | 281 | 30%, 100 g | Xylene, 450 g | 21-23 | 30 | 148 |
| 6b | 10a | 633 | do | 281 | 37%, 81 g | Xylene, 600 g | 21-25 | 26 | 146 |
| 7b | 2a | 441 | Amine 5 | 394 | 37%, 81 g | Xylene, 400 g | 23-28 | 26 | 147 |
| 8b | 5a | 480 | do | 394 | 37%, 81 g | Xylene, 450 g | 22-26 | 26 | 146 |
| 9b | 10a | 633 | do | 394 | 37%, 81 g | Xylene, 600 g | 21-25 | 38 | 150 |
| 10b | 13a | 473 | Amine 13 | 379 | 30%, 100 g | Xylene, 450 g | 20-24 | 36 | 149 |
| 11b | 14a | 511 | do | 379 | 30%, 100 g | Xylene, 500 g | 21-22 | 24 | 142 |
| 12b | 15a | 665 | do | 379 | 30%, 100 g | Xylene, 650 g | 20-21 | 26 | 145 |
| 13b | 2a | 441 | Amine 16 | 395 | 38%, 81 g | Xylene, 425 g | 22-28 | 28 | 146 |
| 14b | 5a | 480 | do | 395 | 37%, 81 g | Xylene, 450 g | 23-30 | 27 | 150 |
| 15b | 9a | 595 | do | 395 | 37%, 81 g | Xylene, 550 g | 20-24 | 29 | 147 |
| 16b | 2a | 441 | Amine 17 | 99 | 37%, 81 g | Xylene, 440 g | 20-21 | 30 | 148 |
| 17b | 5a | 480 | do | 99 | 37%, 81 g | Xylene, 480 g | 21-26 | 32 | 146 |
| 18b | 14a | 511 | do | 99 | 37%, 81 g | Xylene, 600 g | 21-23 | 26 | 147 |
| 19b | 22a | 498 | Amine 18 | 113 | 37%, 81 g | Xylene, 500 g | 21-32 | 29 | 150 |
| 20b | 23a | 542 | do | 113 | 37%, 81 g | Xylene, 500 g | 21-30 | 32 | 150 |
| 21b | 25a | 547 | do | 113 | 37%, 81 g | Xylene, 550 g | 21-23 | 37 | 150 |
| 22b | 2a | 441 | Amine 19 | 126 | 37%, 81 g | Xylene, 440 g | 20-22 | 30 | 150 |
| 23b | 26a | 595 | do | 126 | 37%, 81 g | Xylene, 600 g | 20-25 | 36 | 149 |
| 24b | 27a | 391 | do | 126 | 30%, 50 g | Xylene, 400 g | 20-24 | 32 | 152 |

The amine numbers referred to are the ring compounds identified previously by number in Part 2.

PART FOUR

In preparing oxyalkylated derivatives of products of the kind which appear as examples in Part 3, the procedures employed are substantially the same as those conventionally used in carrying out oxalkylations, and for this reason the oxyalkylation step will be simply illustrated by the following specific examples:

Example 1c

The oxyalkylation-susceptible compound employed is the one previously described and designated as Example 1b. Condensate 1b was in turn obtained from 2-oleylimidazoline and the resin previously identified as Example 2a. Reference to Table I shows that this particular resin is obtained from paratertiarybutylphenol and formaldehyde. 15.18 pounds of this resin condensate were dissolved in 6 pounds of solvent (xylene) along with 1.0 pound of finely powdered caustic soda as a catalyst. Adjustment was made in the autoclave to operate at a temperature of approximately 125° C. to 135° C., and at a pressure of about 20 to 25 pounds. In some subsequent examples pressures up to 35 pounds were employed.

The time regulator was set so as to inject the ethylene oxide in approximately three-quarters of an hour and then continue stirring for 15 minutes or longer, a total time of one hour. The reaction went readily, and, as a matter of fact, the oxide was taken up almost immediately. The speed of reaction, particularly at the low pressure, undoubtedly was due in a large measure to excellent agitation and also to the comparatively high concentration of catalyst. The amount of ethylene oxide introduced was equal in weight to the initial condensation product, to wit, 15.18 pounds. This represented a molal ratio of 34.5 moles of ethylene oxide per mole of condensate.

The theoretical molecular weight at the end of the reaction period was 3036. A comparatively small sample, less than 50 grams, was withdrawn merely for examination as far as solubility or emulsifying power was concerned and also for the purpose of making some tests on various oil field emulsions. The amount withdrawn was so small that no cognizance of this fact is included in the data, or subsequent data, or in the data presented in tubular form in subsequent Tables 3 and 4.

The size of the autoclave employed was 25 gallons. In innumerable comparable oxalkylations I have withdrawn a substantial portion at the end of each step and continued oxalkylation on a partial residual sample. This was not the case in this particular series. Certain examples were duplicated as hereinafter noted and subjected to oxyalkylation with a different oxide.

Example 2c

This example simply illustrates the further oxyalkylation of Example 1c, preceding. As previously stated, the oxyalkylation-susceptible compound, to wit, Example 1b, present at the beginning of the stage was obviously the same as at the end of the prior stage (Example 1c), to wit, 15.18 pounds. The amount of oxide present in the initial step was 15.18 pounds, the amount of catalyst remained the same, to wit 1.0 pound, and the amount of solvent remained the same. The amount of oxide added was another 15.18 pounds, all addition of oxide in these various stages being based on the addition of this particular amount. Thus, at the end of the oxyethylation step the amount of oxide added was a total of 30.36 pounds and the molal ratio of ethylene oxide to resin condensate was 69.0 to 1.0. The theoretical molecular weight was 3348.

The maximum temperature during the operation was 125° C. to 130° C. The maximum pressure was in the range of 20 to 25 pounds. The time period was one and one-half hours.

Example 3c

The oxyalkylation proceeded in the same manner described in Examples 1c and 2c. There was no added solvent and no added catalyst. The oxide added was 15.18 pounds and the total oxide at the end of the oxyethylation step was 45.54 pounds. The molal ratio of oxide to condensate was 103.5 to 1. Conditions as far as temperature and pressure and time were concerned were all the same as in Example 1c and 2c. The time period was somewhat longer than in previous examples, to wit, 3 hours.

Example 4c

The oxyethylation was continued and the amount of oxide added again was 15.18 pounds. There was no added catalyst and no added solvent. The theoretical molecular weight at the end of the reaction period was 6072. The molal ratio of oxide to condensate was 138.0 to 1. Conditions as far as temperature and pressure were concerned were the same as in previous examples. The time period was slightly longer, to wit, 3½ hours. The reaction unquestionably began to slow up somewhat.

Example 5c

The oxyethylation continued with the introduction of another 15.18 pounds of ethylene oxide. No more solvent was introduced but .3 pound caustic soda was added. The theoretical molecular weight at the end of the agitation period was 9108, and the molal ratio of oxide to resin condensate was 172.5 to 1. The time period, however, dropped to 3 hours. Operating temperature and pressure remained the same as in the previous example.

*Example 6c*

The same procedure was followed as in the previous examples. The amount of oxide added was another 15.18 pounds, bringing the total oxide introduced to 91.08 pounds. The temperature and pressure during this period were the same as before. There was no added solvent. The time period was 3½ hours. Molal ratio of oxide to resin condensate was 207.0 to one.

*Example 7c*

The same procedure was followed as in the previous six examples without the addition of more caustic or more solvent. The total amount of oxide introduced at the end of the period was 106.26 pounds. The theoretical molecular weight at the end of the oxyalkylation period was 12,144. The time required for the oxyethylation was a bit longer than in the previous step, to wit, 4 hours.

*Example 8c*

This was the final oxyethylation in this particular series. There was no added solvent and no added catalyst. The total amount of oxide added at the end of this step was 121.44 pounds. The theoretical molecular weight was 13,662. The molal ratio of oxide to resin condensate was 276.0 to one. Conditions as far as temperature and pressure were concerned were the same as in the previous examples and the time required for oxyethylation was 4 hours.

The same procedure as described in the previous examples was employed in connection with a number of the other condensates, described previously. All these data have been presented in tabular form in a series of four tables, Tables III and IV, V and VI.

In substantially every case a 25-gallon autoclave was employed, although in some instances the initial oxyethylation was started in a 15-gallon autoclave and then transferred to a 25-gallon autoclave. This is immaterial but happened to be a matter of convenience only. The solvent used in all cases was xylene. The catalyst used was finely powdered caustic soda.

Referring now to Tables III and IV, it will be noted that compounds 1c through 40c were obtained by the use of ethylene oxide, whereas 41c through 80c were obtained by the use of propylene oxide alone.

Thus, in reference to Table III it is to be noted as follows:

The example number of each compound is indicated in the first column.

The identity of the oxyalkylation-susceptible compound, to wit, the resin condensate, is indicated in the second column.

The amount of condensate is shown in the third column.

Assuming that ethylene oxide alone is employed, as happens to be the case in Examples 1c through 40c, the amount of oxide present in the oxyalkylation derivative is shown in column 4, although in the initial step since no oxide is present there is a blank.

When ethylene oxide is used exclusively the 5th column is blank.

The 6th column shows the amount of powdered caustic soda used as a catalyst, and the 7th column shows the amount of solvent employed.

The 8th column can be ignored where a single oxide was employed.

The 9th column shows the theoretical molecular weight at the end of the oxyalkylation period.

The 10th column states the amount of condensate present in the reaction mass at the end of the period.

As pointed out previously, in this particular series the amount of reaction mass withdrawn for examination was so small that it was ignored and for this reason the resin condensate in column 10 coincides with the figure in column 3.

Column 11 shows the amount of ethylene oxide employed in the reaction mass at the end of the particular period.

Column 12 can be ignored insofar that no propylene oxide was employed.

Column 13 shows the catalyst at the end of the reaction period.

Column 14 shows the amount of solvent at the end of the reaction period.

Column 15 shows the molal ratio of ethylene oxide to condensate.

Column 16 can be ignored for the reason that no propylene oxide was employed.

Referring now to Table VI. It is to be noted that the first column refers to Examples 1c, 2c, 3c, etc.

The second column gives the maximum temperature employed during the oxyalkylation step and the third column gives the maximum pressure.

The fourth column gives the time period employed.

The last three columns show solubility tests by shaking a small amount of the compound, including the solvent present, with several volumes of water, xylene and kerosene. It sometimes happens that although xylene in comparatively small amounts will dissolve in the concentrated material, when the concentrated material in turn is diluted with xylene separation takes place.

Referring to Table IV, Examples 41c through 80c are the counterparts of Examples 1c through 40c, except that the oxide employed is propylene oxide instead of ethylene oxide. Therefore, as explained previously, four columns are blank, to wit, columns 4, 8, 11 and 15.

Reference is now made to Table V. It is to be noted these compounds are designated by "d" numbers, 1d, 2d, 3d, etc., through and including 32d. They are derived, in turn, from compounds in the "c" seires, for example, 36c, 40c, 54c, and 76c. These compounds involve the use of both ethylene oxide and propylene oxide. Since compounds 1c through 40c were obtained by the use of ethylene oxide, it is obvious that those obtained from 36c and 40c, involve the use of ethylene oxide first, and propylene oxide afterward. Inversely, those compounds obtained from 54c and 76c obviously come from a prior series in which propylene oxide was used first.

In the preparation of this series indicated by the small letter "d," as 1d, 2d, 3d, etc., the initial "c" series such as 36c, 40c, 54c, and 76c, were duplicated and the oxyalkylation stopped at the point designated instead of being carried further as may have been the case in the original oxyalkylation step. Then oxyalkylation proceeded by using the second oxide as indicated by the previous explanation, to wit, propylene oxide in 1d through 16d, and ethylene oxide in 17d through 32d, inclusive.

In examining the table beginning with 1d, it will be noted that the initial product, i. e., 36c, consisted of the reaction product involving 15.18 pounds of the resin condensate, 22.27 pounds of ethylene oxide, 1.0 pound of caustic soda, and 6.0 pounds of the solvent.

It is to be noted that reference to the catalyst in Table V refers to the total amount of catalyst, i. e., the catalyst present from the first oxyalkylation step plus added catalyst, if any. The same is true in regard to the solvent. Reference to the solvent refers to the total solvent present, i. e., that from the first oxyalkylation step plus added solvent, if any.

In this series, it will be noted that the theoretical molecular weights are given prior to the oxyalkylation step and after the oxyalkylation step, although the value at the end of one step is the value at the beginning of the next step, except obviously at the very start the value depends on the theoretical molecular weight at the end of the initial oxyalkylation step; i. e., oxyethylation for 1d through 16d, and oxypropylation for 17d through 32d.

It will be noted also that under the molal ratio the values of both oxides to the resin condensate are included.

The data given in regard to the operating conditions is substantially the same as before and appears in Table VI.

The products resulting from these procedures may contain modest amounts, or have small amounts, of the solvents as indicated by the figures in the tables. If desired the solvent may be removed by distillation, and particularly vacuum distillation. Such distillation also may remove traces or small amounts of uncombined oxide, if present and volatile under the conditions employed.

Obviously, in the use of ethylene oxide and propylene oxide in combination one need not first use one oxide and then the other, but one can mix the two oxides and thus obtain what may be termed an indifferent oxyalkylation, i. e., no attempt to selectively add one and then the other, or any other variant.

Needless to say, one could start with ethylene oxide and then use propylene oxide, and then go back to ethylene oxide; or, inversely, start with propylene oxide, then use ethylene oxide, and then go back to propylene oxide; or, one could use a combination in which butylene oxide is used along with either one of the two oxides just mentioned, or a combination of both of them.

The colors of the products usually vary from a reddish amber tint to a definitely red, and amber. The reason is primarily that no effort is made to obtain colorless resins initially and the resins themselves may be yellow, amber, or even dark amber. Condensation of a nitrogenous product invariably yields a darker product than the original resin and usually has a reddish color. The solvent employed, if xylene, adds nothing to the color but one may use a darker colored aromatic petroleum solvent. Oxyalkylation generally tends to yield lighter colored products and the more oxide employed the lighter the color of the product. Products can be prepared in which the final color is a lighter amber with a reddish tint. Such products can be decolorized by the use of clays, bleaching chars, etc. As far as use in demulsification is concerned, or some other industrial uses, there is no justification for the cost of bleaching the product.

If the oxyalkylated derivatives were not used in subsequent esterification reactions, then alkalinity, whether due to an amino nitrogen atom or added catalyst, would be immaterial for many purposes. For esterification it is preferable that the alkalinity be eliminated in any one of a number of ways; (a) add an acid equivalent to the added catalyst; (b) convert the catalyst into sodium chloride and the amine radical into a hydrochloride; or (c) use an excess of the polycarboxy reactant even though a small percentage is wasted. All this is discussed in detail in the next section. More careful examination of this type of material can be made by methods employing the well known Karl Fischer reagents as described in Aquametry, Smith and Mitchell, Jr., Interscience Publishers, New York, 1948.

TABLE III

| Ex. No. | Composition before | | | | | | | Composition at end | | | | | | Molal ratio | |
|---|---|---|---|---|---|---|---|---|---|---|---|---|---|---|---|
| | O-S cmpd., ex. No. | O-S* cmpd., lbs. | Ethyl. oxide, lbs. | Propl. oxide, lbs. | Catalyst, lbs. | Solvent, lbs. | Theo. mol. wt. | Theo. mol. wt. | O-S* cmpd., lbs. | Ethyl. oxide, lbs. | Propl. oxide, lbs. | Catalyst, lbs. | Solvent, lbs. | Ethyl. oxide to resin condensate | Propl. oxide to resin condensate |
| 1c | 1b | 15.18 | | | 1.5 | 6.0 | | 3,036 | 15.18 | 15.18 | | 1.5 | 6.0 | 34.5 | |
| 2c | 1b | 15.18 | 15.18 | | 1.5 | 6.0 | | 4,554 | 15.18 | 30.36 | | 1.5 | 6.0 | 69.0 | |
| 3c | 1b | 15.18 | 30.36 | | 1.5 | 6.0 | | 6,072 | 15.18 | 45.54 | | 1.5 | 6.0 | 103.5 | |
| 4c | 1b | 15.18 | 45.54 | | 1.5 | 6.0 | | 7,590 | 15.18 | 60.72 | | 1.5 | 6.0 | 138.0 | |
| 5c | 1b | 15.18 | 60.72 | | 1.3 | 6.0 | | 9,108 | 15.18 | 75.90 | | 1.3 | 6.0 | 172.5 | |
| 6c | 1b | 15.18 | 75.90 | | 1.3 | 6.0 | | 10,626 | 15.18 | 91.08 | | 1.3 | 6.0 | 207.0 | |
| 7c | 1b | 15.18 | 91.08 | | 1.3 | 6.0 | | 12,144 | 15.18 | 106.26 | | 1.3 | 6.0 | 241.5 | |
| 8c | 1b | 15.18 | 106.26 | | 1.3 | 6.0 | | 13,662 | 15.18 | 121.44 | | 1.3 | 6.0 | 276.0 | |
| 9c | 5b | 15.46 | | | 1.5 | 4.5 | | 3,092 | 15.46 | 15.46 | | 1.5 | 4.5 | 35.2 | |
| 10c | 5b | 15.46 | 15.46 | | 1.5 | 4.5 | | 4,638 | 15.46 | 30.92 | | 1.5 | 4.5 | 70.4 | |
| 11c | 5b | 15.46 | 30.92 | | 1.5 | 4.5 | | 6,184 | 15.46 | 46.38 | | 1.5 | 4.5 | 105.6 | |
| 12c | 5b | 15.46 | 46.38 | | 1.5 | 4.5 | | 7,730 | 15.46 | 61.84 | | 1.5 | 4.5 | 140.8 | |
| 13c | 5b | 15.46 | 61.84 | | 1.3 | 4.5 | | 9,276 | 15.46 | 77.30 | | 1.3 | 4.5 | 176.0 | |
| 14c | 5b | 15.46 | 77.30 | | 1.3 | 4.5 | | 10,822 | 15.46 | 92.76 | | 1.3 | 4.5 | 211.2 | |
| 15c | 5b | 15.46 | 92.76 | | 1.3 | 4.5 | | 12,368 | 15.46 | 108.22 | | 1.3 | 4.5 | 246.4 | |
| 16c | 5b | 15.46 | 108.22 | | 1.3 | 4.5 | | 13,914 | 15.46 | 123.68 | | 1.3 | 4.5 | 281.6 | |
| 17c | 14b | 17.74 | | | 1.0 | 4.5 | | 3,548 | 17.74 | 17.74 | | 1.0 | 4.5 | 40.4 | |
| 18c | 14b | 17.74 | 17.74 | | 1.0 | 4.5 | | 5,322 | 17.74 | 35.48 | | 1.0 | 4.5 | 80.8 | |
| 19c | 14b | 17.74 | 35.48 | | 1.0 | 4.5 | | 7,096 | 17.74 | 53.22 | | 1.0 | 4.5 | 121.2 | |
| 20c | 14b | 17.74 | 53.22 | | 1.0 | 4.5 | | 8,870 | 17.74 | 70.96 | | 1.0 | 4.5 | 161.6 | |
| 21c | 14b | 17.74 | 70.96 | | 1.5 | 4.5 | | 10,644 | 17.74 | 88.70 | | 1.0 | 4.5 | 202.0 | |
| 22c | 14b | 17.74 | 88.70 | | 1.5 | 4.5 | | 12,418 | 17.74 | 106.44 | | 1.0 | 4.5 | 242.4 | |
| 23c | 14b | 17.74 | 106.44 | | 1.5 | 4.5 | | 14,192 | 17.74 | 124.18 | | 1.0 | 4.5 | 282.8 | |
| 24c | 14b | 17.74 | 124.18 | | 1.5 | 4.5 | | 15,966 | 17.74 | 141.92 | | 1.0 | 4.5 | 363.6 | |
| 25c | 22b | 11.58 | | | 1.0 | 4.4 | | 2,316 | 11.58 | 11.58 | | 1.0 | 4.4 | 26.3 | |
| 26c | 22b | 11.58 | 11.58 | | 1.0 | 4.4 | | 3,474 | 11.58 | 23.16 | | 1.0 | 4.4 | 52.6 | |
| 27c | 22b | 11.48 | 23.16 | | 1.0 | 4.4 | | 4,632 | 11.58 | 34.74 | | 1.0 | 4.4 | 78.9 | |
| 28c | 22b | 11.58 | 34.74 | | 1.0 | 4.4 | | 5,790 | 11.58 | 46.32 | | 1.0 | 4.4 | 105.2 | |
| 29c | 22b | 11.58 | 46.32 | | 1.5 | 4.4 | | 6,948 | 11.58 | 57.90 | | 1.5 | 4.4 | 131.5 | |
| 30c | 22b | 11.58 | 57.90 | | 1.5 | 4.4 | | 8,106 | 11.58 | 69.48 | | 1.5 | 4.4 | 157.8 | |
| 31c | 22b | 11.58 | 69.48 | | 1.5 | 4.4 | | 9,264 | 11.58 | 81.06 | | 1.5 | 4.4 | 184.1 | |
| 32c | 22b | 11.58 | 81.06 | | 1.5 | 4.4 | | 10,422 | 11.58 | 92.64 | | 1.5 | 4.4 | 210.4 | |
| 33c | 1b | 15.18 | | | 1.0 | 6.0 | | 2,277 | 15.18 | 7.59 | | 1.0 | 6.0 | 17.2 | |
| 34c | 1b | 15.18 | 7.59 | | 1.0 | 6.0 | | 3,036 | 15.18 | 15.18 | | 1.0 | 6.0 | 34.4 | |
| 35c | 1b | 15.18 | 15.18 | | 1.0 | 6.0 | | 3,795 | 15.18 | 22.77 | | 1.0 | 6.0 | 51.6 | |
| 36c | 1b | 15.18 | 22.77 | | 1.0 | 6.0 | | 4,554 | 15.18 | 30.36 | | 1.0 | 6.0 | 68.8 | |
| 37c | 1b | 15.18 | 30.36 | | 1.3 | 6.0 | | 5,313 | 15.18 | 37.95 | | 1.3 | 6.0 | 86.0 | |
| 38c | 1b | 15.18 | 37.95 | | 1.3 | 6.0 | | 6,072 | 15.18 | 45.54 | | 1.3 | 6.0 | 103.2 | |
| 39c | 1b | 15.18 | 45.54 | | 1.3 | 6.0 | | 6,831 | 15.18 | 53.13 | | 1.3 | 6.0 | 120.4 | |
| 40c | 1b | 15.18 | 53.13 | | 1.3 | 6.0 | | 7,590 | 15.18 | 60.72 | | 1.3 | 6.0 | 137.6 | |

*Oxyalkylation-susceptible.

TABLE IV

| Ex. No. | Composition before | | | | | | | Composition at end | | | | | | Molal ratio | |
|---|---|---|---|---|---|---|---|---|---|---|---|---|---|---|---|
| | O-S cmpd., ex. No. | O-S* cmpd., lbs. | Ethyl. oxide, lbs. | Propl. oxide, lbs. | Cata-lyst, lbs. | Sol-vent, lbs. | Theo. mol. wt. | Theo. mol. wt. | O-S* cmpd., lbs. | Ethyl. oxide, lbs. | Propl. oxide, lbs. | Cata-lyst, lbs. | Sol-vent, lbs. | Ethyl. oxide to resin conden-sate | Propl. oxide to resin conden-sate |
| 41c | 1b | 15.18 | | | 1.1 | 6.0 | | 3,036 | 15.18 | | 15.18 | 1.1 | 6.0 | | 26.2 |
| 42c | 1b | 15.18 | | 15.18 | 1.1 | 6.0 | | 4,554 | 15.18 | | 30.36 | 1.1 | 6.0 | | 52.4 |
| 43c | 1b | 15.18 | | 30.36 | 1.1 | 6.0 | | 6,072 | 15.18 | | 45.54 | 1.1 | 6.0 | | 78.6 |
| 44c | 1b | 15.18 | | 45.54 | 1.1 | 6.0 | | 7,590 | 15.18 | | 60.72 | 1.1 | 6.0 | | 104.8 |
| 45c | 1b | 15.18 | | 60.72 | 1.1 | 6.0 | | 10,626 | 15.18 | | 75.90 | 1.1 | 6.0 | | 131.0 |
| 46c | 1b | 15.18 | | 75.90 | 1.5 | 6.0 | | 13,662 | 15.18 | | 106.26 | 1.5 | 6.0 | | 183.4 |
| 47c | 1b | 15.18 | | 106.26 | 1.5 | 6.0 | | 16,698 | 15.18 | | 136.62 | 1.5 | 6.0 | | 235.8 |
| 48c | 1b | 15.18 | | 136.62 | 1.5 | 6.0 | | 18,216 | 15.18 | | 166.98 | 1.5 | 6.0 | | 288.2 |
| 49c | 5b | 15.46 | | | 1.1 | 4.5 | | 3,092 | 15.46 | | 15.46 | 1.1 | 4.5 | | 26.6 |
| 50c | 5b | 15.46 | | 15.46 | 1.1 | 4.5 | | 4,638 | 15.46 | | 30.92 | 1.1 | 4.5 | | 53.2 |
| 51c | 5b | 15.46 | | 30.92 | 1.1 | 4.5 | | 6,184 | 15.46 | | 46.38 | 1.1 | 4.5 | | 79.8 |
| 52c | 5b | 15.46 | | 46.38 | 1.1 | 4.5 | | 7,730 | 15.46 | | 61.84 | 1.1 | 4.5 | | 106.4 |
| 53c | 5b | 15.46 | | 61.84 | 1.1 | 4.5 | | 10,822 | 15.46 | | 77.30 | 1.1 | 4.5 | | 133.0 |
| 54c | 5b | 15.46 | | 77.30 | 1.5 | 4.5 | | 13,914 | 15.46 | | 108.22 | 1.5 | 4.5 | | 186.2 |
| 55c | 5b | 15.46 | | 108.22 | 1.5 | 4.5 | | 17,006 | 15.46 | | 139.14 | 1.5 | 4.5 | | 239.4 |
| 56c | 5b | 15.46 | | 139.14 | 1.5 | 4.5 | | 18,552 | 15.46 | | 170.06 | 1.5 | 4.5 | | 292.6 |
| 57c | 14b | 17.74 | | | 1.2 | 4.5 | | 3,548 | 17.74 | | 17.74 | 1.2 | 4.5 | | 30.6 |
| 58c | 14b | 17.74 | | 17.74 | 1.2 | 4.5 | | 5,322 | 17.74 | | 35.48 | 1.2 | 4.5 | | 61.2 |
| 59c | 14b | 17.74 | | 35.48 | 1.2 | 4.5 | | 7,096 | 17.74 | | 53.22 | 1.2 | 4.5 | | 91.8 |
| 60c | 14b | 17.74 | | 53.22 | 1.2 | 4.5 | | 8,870 | 17.74 | | 70.96 | 1.2 | 4.5 | | 122.4 |
| 61c | 14b | 17.74 | | 70.96 | 1.2 | 4.5 | | 12,418 | 17.74 | | 88.70 | 1.2 | 4.5 | | 153.0 |
| 62c | 14b | 17.74 | | 88.70 | 1.7 | 4.5 | | 15,966 | 17.74 | | 124.18 | 1.7 | 4.5 | | 214.2 |
| 63c | 14b | 17.74 | | 124.18 | 1.7 | 4.5 | | 19,514 | 17.74 | | 159.66 | 1.7 | 4.5 | | 275.4 |
| 64c | 14b | 17.74 | | 159.66 | 1.7 | 4.5 | | 21,288 | 17.74 | | 195.14 | 1.7 | 4.5 | | 336.6 |
| 65c | 22b | 11.58 | | | 1.0 | 4.4 | | 2,316 | 11.58 | | 11.58 | 1.0 | 4.4 | | 19.95 |
| 66c | 22b | 11.58 | | 11.58 | 1.0 | 4.4 | | 3,474 | 11.58 | | 23.16 | 1.0 | 4.4 | | 39.90 |
| 67c | 22b | 11.58 | | 23.16 | 1.0 | 4.4 | | 4,632 | 11.58 | | 34.74 | | 4.4 | | 59.80 |
| 68c | 22b | 11.58 | | 34.74 | 1.0 | 4.4 | | 5,790 | 11.58 | | 46.32 | 1.0 | 4.4 | | 79.80 |
| 69c | 22b | 11.58 | | 46.32 | 1.0 | 4.4 | | 8,106 | 11.58 | | 57.90 | 1.0 | 4.4 | | 99.60 |
| 70c | 22b | 11.58 | | 57.90 | 1.5 | 4.4 | | 10,422 | 11.58 | | 81.06 | 1.5 | 4.4 | | 140.0 |
| 71c | 22b | 11.58 | | 81.06 | 1.5 | 4.4 | | 12,738 | 11.58 | | 104.22 | 1.5 | 4.4 | | 180.0 |
| 72c | 22b | 11.58 | | 104.22 | 1.5 | 4.4 | | 13,896 | 11.58 | | 127.38 | 1.5 | 4.4 | | 219.9 |
| 73c | 1b | 15.18 | | | 1.0 | 6.0 | | 2,279 | 15.18 | | 7.59 | 1.0 | 6.0 | | 13.15 |
| 74c | 1b | 15.18 | | 7.59 | 1.0 | 6.0 | | 3,036 | 15.18 | | 15.18 | 1.0 | 6.0 | | 26.3 |
| 75c | 1b | 15.18 | | 15.18 | 1.0 | 6.0 | | 3,795 | 15.18 | | 22.77 | 1.0 | 6.0 | | 39.45 |
| 76c | 1b | 15.18 | | 22.77 | 1.0 | 6.0 | | 4,554 | 15.18 | | 30.36 | 1.0 | 6.0 | | 52.60 |
| 77c | 1b | 15.18 | | 30.36 | 1.0 | 6.0 | | 5,313 | 15.18 | | 37.95 | 1.0 | 6.0 | | 65.75 |
| 78c | 1b | 15.18 | | 37.95 | 1.4 | 6.0 | | 6,831 | 15.18 | | 53.13 | 1.4 | 6.0 | | 92.05 |
| 79c | 1b | 15.18 | | 53.13 | 1.4 | 6.0 | | 8,349 | 15.18 | | 68.31 | 1.4 | 6.0 | | 118.35 |
| 80c | 1b | 15.18 | | 68.31 | 1.4 | 6.0 | | 9,867 | 15.18 | | 83.49 | 1.4 | 6.0 | | 144.65 |

*Oxyalkylation-susceptible.

TABLE V

| Ex. No. | Composition before | | | | | | | Composition at end | | | | | | Molal ratio | |
|---|---|---|---|---|---|---|---|---|---|---|---|---|---|---|---|
| | O-S cmpd., ex. No. | O-S* cmpd., lbs. | Ethyl. oxide, lbs. | Propl. oxide, lbs. | Cata-lyst, lbs. | Sol-vent, lbs. | Theo. mol. wt. | Theo. mol. wt. | O-S* cmpd., lbs. | Ethyl. oxide, lbs. | Propl. oxide, lbs. | Cata-lyst, lbs. | Sol-vent, lbs. | Ethyl. oxide to resin conden-sate | Propl. oxide to resin conden-sate |
| 1d | 36c | 15.18 | 30.36 | | 1.0 | 6.0 | 4,554 | 5,313 | 15.18 | 30.36 | 7.59 | 1.0 | 6.0 | 68.8 | 13.10 |
| 2d | 36c | 15.18 | 30.36 | 7.59 | 1.0 | 6.0 | 5,313 | 6,072 | 15.18 | 30.36 | 15.18 | 1.0 | 6.0 | 68.8 | 26.15 |
| 3d | 36c | 15.18 | 30.36 | 15.18 | 1.0 | 6.0 | 6,072 | 6,831 | 15.18 | 30.36 | 22.77 | 1.0 | 6.0 | 68.8 | 39.20 |
| 4d | 36c | 15.18 | 30.36 | 22.77 | 1.0 | 6.0 | 6,831 | 7,590 | 15.18 | 30.36 | 30.36 | 1.0 | 6.0 | 68.8 | 52.3 |
| 5d | 36c | 15.18 | 30.36 | 30.36 | 1.0 | 6.0 | 7,590 | 8,349 | 15.18 | 30.36 | 37.95 | 1.0 | 6.0 | 68.8 | 60.5 |
| 6d | 36c | 15.18 | 30.36 | 37.95 | 1.0 | 6.0 | 8,349 | 9,108 | 15.18 | 30.36 | 45.54 | 1.5 | 6.0 | 68.8 | 78.6 |
| 7d | 36c | 15.18 | 30.36 | 45.54 | 1.5 | 6.0 | 9,108 | 10,626 | 15.18 | 30.36 | 60.72 | 1.5 | 6.0 | 68.8 | 104.8 |
| 8d | 36c | 15.18 | 30.36 | 60.72 | 1.5 | 6.0 | 10,626 | 12,144 | 15.18 | 30.36 | 75.90 | 1.5 | 6.0 | 68.8 | 131.8 |
| 9d | 40c | 15.18 | 60.72 | | 1.3 | 6.0 | 7,590 | 8,349 | 15.18 | 60.72 | 7.59 | 1.3 | 6.0 | 137.6 | 13.1 |
| 10d | 40c | 15.18 | 60.72 | 7.59 | 1.3 | 6.0 | 8,349 | 9,108 | 15.18 | 60.72 | 15.18 | 1.3 | 6.0 | 137.6 | 26.2 |
| 11d | 40c | 15.18 | 60.72 | 15.18 | 1.3 | 6.0 | 9,108 | 10,626 | 15.18 | 60.72 | 30.36 | 1.3 | 6.0 | 137.6 | 52.4 |
| 12d | 40c | 15.18 | 60.72 | 30.36 | 1.3 | 6.0 | 10,626 | 12,144 | 15.18 | 60.72 | 45.54 | 1.3 | 6.0 | 137.6 | 78.6 |
| 13d | 40c | 15.18 | 60.72 | 45.54 | 1.3 | 6.0 | 12,144 | 13,662 | 15.18 | 60.72 | 60.72 | 1.8 | 6.0 | 137.6 | 104.8 |
| 14d | 40c | 15.18 | 60.72 | 60.72 | 1.8 | 6.0 | 13,662 | 14,421 | 15.18 | 60.72 | 68.21 | 1.8 | 6.0 | 137.6 | 117.9 |
| 15d | 40c | 15.18 | 60.72 | 68.21 | 1.8 | 6.0 | 14,421 | 15,180 | 15.18 | 60.72 | 75.90 | 1.8 | 6.0 | 137.6 | 131.0 |
| 16d | 40c | 15.18 | 60.72 | 75.90 | 1.8 | 6.0 | 15,180 | 16,698 | 15.18 | 60.72 | 91.08 | 1.8 | 6.0 | 137.6 | 157.2 |
| 17d | 54c | 15.46 | | 108.22 | 1.5 | 4.5 | 13,914 | 14,300 | 15.46 | 3.86 | 108.22 | 1.5 | 4.5 | 8.75 | 186.2 |
| 18d | 54c | 15.46 | 3.86 | 108.22 | 1.5 | 4.5 | 14,300 | 14,687 | 15.46 | 7.73 | 108.22 | 1.5 | 4.5 | 17.6 | 186.2 |
| 19d | 54c | 15.46 | 7.73 | 108.22 | 1.5 | 4.5 | 14,687 | 15,460 | 15.46 | 15.46 | 108.22 | 1.5 | 4.5 | 35.2 | 186.2 |
| 20d | 54c | 15.46 | 15.46 | 108.22 | 1.5 | 4.5 | 15,460 | 16,333 | 15.46 | 23.19 | 108.22 | 1.5 | 4.5 | 52.8 | 186.2 |
| 21d | 54c | 15.46 | 23.19 | 108.22 | 1.5 | 4.5 | 16,333 | 17,106 | 15.46 | 30.92 | 108.22 | 1.5 | 4.5 | 70.3 | 186.2 |
| 22d | 54c | 15.46 | 30.92 | 108.22 | 1.5 | 4.5 | 17,106 | 16,879 | 15.46 | 38.65 | 108.22 | 1.5 | 4.5 | 87.9 | 186.2 |
| 23d | 54c | 15.46 | 38.65 | 108.22 | 1.5 | 4.5 | 17,879 | 18,652 | 15.46 | 46.38 | 108.22 | 1.5 | 4.5 | 105.2 | 186.2 |
| 24d | 54c | 15.46 | 46.38 | 108.22 | 1.5 | 4.5 | 18,652 | 19,425 | 15.46 | 54.11 | 108.22 | 1.5 | 4.5 | 123.0 | 186.2 |
| 25d | 76c | 15.18 | | 30.36 | 1.0 | 6.0 | 4,554 | 5,313 | 15.18 | 7.59 | 30.36 | 1.0 | 6.0 | 17.25 | 52.6 |
| 26d | 76c | 15.18 | 7.59 | 30.36 | 1.0 | 6.0 | 5,313 | 6,072 | 15.18 | 15.18 | 30.36 | 1.0 | 6.0 | 34.50 | 52.6 |
| 27d | 76c | 15.18 | 15.18 | 30.36 | 1.0 | 6.0 | 6,072 | 6,831 | 15.18 | 22.77 | 30.36 | 1.0 | 6.0 | 51.75 | 52.6 |
| 28d | 76c | 15.18 | 22.77 | 30.36 | 1.0 | 6.0 | 6,831 | 7,590 | 15.18 | 30.36 | 30.36 | 1.0 | 6.0 | 69.0 | 52.6 |
| 29d | 76c | 15.18 | 30.36 | 30.36 | 1.0 | 6.0 | 7,590 | 9,108 | 15.18 | 45.54 | 30.36 | 1.5 | 6.0 | 103.0 | 52.6 |
| 30d | 76c | 15.18 | 45.54 | 30.36 | 1.5 | 6.0 | 9,108 | 10,626 | 15.18 | 60.72 | 30.36 | 1.5 | 6.0 | 138.2 | 52.6 |
| 31d | 76c | 15.18 | 60.72 | 30.36 | 1.5 | 6.0 | 10,626 | 12,144 | 15.18 | 75.90 | 30.36 | 1.5 | 6.0 | 172.2 | 52.6 |
| 32d | 76c | 15.18 | 75.90 | 30.36 | 1.5 | 6.0 | 12,144 | 13,662 | 15.18 | 91.08 | 30.36 | 1.5 | 6.0 | 207.0 | 52.6 |

*Oxyalkylation-susceptible.

TABLE VI

| Ex. No. | Max. temp., °C. | Max. pres., p.s.i. | Time, hrs. | Solubility Water | Solubility Xylene | Solubility Kerosene |
|---|---|---|---|---|---|---|
| 1c | 125-135 | 20-25 | 1 | Insoluble | | |
| 2c | 125-135 | 20-25 | 1½ | Emulsifiable | | |
| 3c | 125-135 | 20-25 | 3 | Soluble | | |
| 4c | 125-135 | 20-25 | 3½ | ----do---- | | |
| 5c | 125-135 | 20-25 | 3 | ----do---- | | |
| 6c | 125-135 | 20-25 | 3 | ----do---- | | |
| 7c | 125-135 | 20-25 | 4 | ----do---- | | |
| 8c | 125-135 | 20-25 | 4 | ----do---- | | |
| 9c | 125-135 | 15-20 | 2 | Insoluble | | |
| 10c | 125-135 | 15-20 | 2¼ | Emulsifiable | | |
| 11c | 125-135 | 15-20 | 2½ | Soluble | | |
| 12c | 125-135 | 15-20 | 4 | ----do---- | | |
| 13c | 125-135 | 15-20 | 3½ | ----do---- | | |
| 14c | 125-135 | 15-20 | 3¾ | ----do---- | | |
| 15c | 125-135 | 15-20 | 4 | ----do---- | | |
| 16c | 125-135 | 15-20 | 5 | ----do---- | | |
| 17c | 125-135 | 10-15 | 1 | Insoluble | | |
| 18c | 125-135 | 10-15 | 1½ | Emulsifiable | | |
| 19c | 125-135 | 10-15 | 2¼ | Soluble | | |
| 20c | 125-135 | 10-15 | 3 | ----do---- | | |
| 21c | 125-135 | 10-15 | 3 | ----do---- | | |
| 22c | 125-135 | 10-15 | 3½ | ----do---- | | |
| 23c | 125-135 | 10-15 | 4 | ----do---- | | |
| 24c | 125-135 | 10-15 | 4½ | ----do---- | | |
| 25c | 130-135 | 30-35 | 1½ | Insoluble | | |
| 26c | 130-135 | 30-35 | 2 | Emulsifiable | | |
| 27c | 130-135 | 30-35 | 3 | ----do---- | | |
| 28c | 130-135 | 30-35 | 4 | Soluble | | |
| 29c | 130-135 | 30-35 | 4 | ----do---- | | |
| 30c | 130-135 | 30-35 | 5 | ----do---- | | |
| 31c | 130-135 | 30-35 | 7 | ----do---- | | |
| 32c | 130-135 | 30-35 | 8 | ----do---- | | |
| 33c | 130-135 | 30-35 | 2 | Insoluble | | |
| 34c | 130-135 | 30-35 | 2½ | ----do---- | | |
| 35c | 130-135 | 30-35 | 3 | Emulsifiable | | |
| 36x | 130-135 | 30-35 | 4 | Soluble | | |
| 37c | 130-135 | 30-35 | 4 | ----do---- | | |
| 38c | 130-135 | 30-35 | 5 | ----do---- | | |
| 39c | 130-135 | 30-35 | 7 | ----do---- | | |
| 40c | 130-135 | 30-35 | 8 | ----do---- | | |
| 41c | 125-130 | 25-35 | 2 | Insoluble | Soluble | Insoluble. |
| 42c | 125-130 | 25-35 | 2½ | ----do---- | ----do---- | Do. |
| 43c | 125-130 | 25-35 | 3½ | ----do---- | ----do---- | Dispersible. |
| 44c | 125-130 | 25-35 | 4 | ----do---- | ----do---- | Soluble. |
| 45c | 125-130 | 25-35 | 5 | ----do---- | ----do---- | Do. |
| 46c | 125-130 | 25-35 | 4¾ | ----do---- | ----do---- | Do. |
| 47c | 125-130 | 25-35 | 5½ | ----do---- | ----do---- | Do. |
| 48c | 125-130 | 25-35 | 6¼ | ----do---- | ----do---- | Do. |
| 49c | 135-140 | 30-35 | 2 | ----do---- | ----do---- | Insoluble. |
| 50c | 135-140 | 30-35 | 2¾ | ----do---- | ----do---- | Do. |
| 51c | 135-140 | 30-35 | 3 | ----do---- | ----do---- | Dispersible. |
| 52c | 135-140 | 30-35 | 4¼ | ----do---- | ----do---- | Soluble. |
| 53c | 135-140 | 30-35 | 5 | ----do---- | ----do---- | Do. |
| 54c | 135-140 | 30-35 | 5 | ----do---- | ----do---- | Do. |
| 55c | 135-140 | 30-35 | 6¼ | ----do---- | ----do---- | Insoluble. |
| 56c | 135-140 | 30-35 | 6½ | ----do---- | ----do---- | Do. |
| 57c | 125-135 | 30-35 | 2 | ----do---- | ----do---- | Soluble. |
| 58c | 125-135 | 30-35 | 2½ | ----do---- | ----do---- | Do. |
| 59c | 125-135 | 30-35 | 3 | ----do---- | ----do---- | Do. |
| 60c | 125-135 | 30-35 | 3¾ | ----do---- | ----do---- | Do. |
| 61c | 125-135 | 30-35 | 4 | ----do---- | ----do---- | Do. |
| 62c | 125-135 | 30-35 | 4 | ----do---- | ----do---- | Do. |
| 63c | 125-135 | 30-35 | 5 | ----do---- | ----do---- | Do. |
| 64c | 125-135 | 30-35 | 5½ | ----do---- | ----do---- | Insoluble. |
| 65c | 130-135 | 30-40 | 1½ | ----do---- | ----do---- | Do. |
| 66c | 130-135 | 30-40 | 2 | ----do---- | ----do---- | Dispersible. |
| 67c | 130-135 | 30-40 | 3 | ----do---- | ----do---- | Soluble. |
| 68c | 130-135 | 30-40 | 3½ | ----do---- | ----do---- | Do. |
| 69c | 130-135 | 30-40 | 5 | ----do---- | ----do---- | Do. |
| 70c | 130-135 | 30-40 | 4 | ----do---- | ----do---- | Do. |
| 71c | 130-135 | 30-40 | 4½ | ----do---- | ----do---- | Do. |
| 72c | 130-135 | 30-40 | 6 | ----do---- | ----do---- | Do. |
| 73c | 130-135 | 15-20 | 2 | ----do---- | ----do---- | Insoluble. |
| 74c | 130-135 | 15-20 | 2 | ----do---- | ----do---- | Do. |
| 75c | 130-135 | 15-20 | 3 | ----do---- | ----do---- | Do. |
| 76c | 130-135 | 15-20 | 4½ | ----do---- | ----do---- | Do. |
| 77c | 130-135 | 15-20 | 6 | ----do---- | ----do---- | Dispersible. |
| 78c | 130-135 | 15-20 | 5½ | ----do---- | ----do---- | Soluble. |
| 79c | 130-135 | 15-20 | 6½ | ----do---- | ----do---- | Do. |
| 80c | 130-135 | 15-20 | 7 | ----do---- | ----do---- | Do. |
| 1d | 130-135 | 30-35 | ½ | Emulsifiable | ----do---- | Insoluble. |
| 2d | 130-135 | 30-35 | 1 | ----do---- | ----do---- | Do. |
| 3d | 130-135 | 30-35 | 1¼ | ----do---- | ----do---- | Do. |
| 4d | 130-135 | 30-35 | 2 | ----do---- | ----do---- | Do. |
| 5d | 130-135 | 30-35 | 3 | Insoluble | ----do---- | Dispersible. |
| 6d | 130-135 | 30-35 | 1 | ----do---- | ----do---- | Soluble. |
| 7d | 130-135 | 30-35 | 1½ | ----do---- | ----do---- | Do. |
| 8d | 130-135 | 30-35 | 2½ | ----do---- | ----do---- | Do. |
| 9d | 130-135 | 30-35 | ½ | Soluble | Insoluble | Insoluble. |
| 10d | 130-135 | 30-35 | 1¼ | ----do---- | Dispersible | Do. |
| 11d | 130-135 | 30-35 | 2 | ----do---- | Soluble | Do. |
| 12d | 130-135 | 30-35 | 2¾ | ----do---- | ----do---- | Do. |
| 13d | 130-135 | 30-35 | 1 | Emulsifiable | ----do---- | Do. |
| 14d | 130-135 | 30-35 | 1½ | ----do---- | ----do---- | Do. |
| 15d | 130-135 | 30-35 | 1½ | ----do---- | ----do---- | Dispersible. |
| 16d | 130-135 | 30-35 | 2 | ----do---- | ----do---- | Soluble. |
| 17d | 135-140 | 30-35 | ½ | Insoluble | ----do---- | Do. |
| 18d | 135-140 | 30-35 | ¾ | ----do---- | ----do---- | Do. |
| 19d | 135-140 | 30-35 | ¾ | Emulsifiable | ----do---- | Do. |
| 20d | 135-140 | 30-35 | 1 | ----do---- | ----do---- | Do. |
| 21d | 135-140 | 30-35 | 1¾ | ----do---- | ----do---- | Do. |
| 22d | 135-140 | 30-35 | 2½ | Soluble | ----do---- | Do. |
| 23d | 135-140 | 30-35 | 3 | ----do---- | ----do---- | Insoluble. |
| 24d | 135-140 | 30-35 | 3½ | ----do---- | ----do---- | Do. |

TABLE VI—Continued

| Ex. No. | Max. temp., °C. | Max. pres., p.s.i. | Time, hrs. | Solubility Water | Solubility Xylene | Solubility Kerosene |
|---|---|---|---|---|---|---|
| 25d | 130-135 | 15-20 | ¾ | Insoluble | Soluble | Insoluble. |
| 26d | 130-135 | 15-20 | 1 | Emulsifiable | ----do---- | Do. |
| 27d | 130-135 | 15-20 | 2 | ----do---- | ----do---- | Do. |
| 28d | 130-135 | 15-20 | 3 | ----do---- | ----do---- | Do. |
| 29d | 130-135 | 15-20 | 1¼ | Soluble | ----do---- | Do. |
| 30d | 130-135 | 15-20 | 1¼ | ----do---- | Insoluble | Do. |
| 31d | 130-135 | 15-20 | 1¾ | ----do---- | ----do---- | Do. |
| 32d | 130-135 | 15-20 | 2½ | ----do---- | ----do---- | Do. |

PART 5

As previously pointed out, the present invention is concerned with acidic esters obtained from the oxyalkylated derivatives described in Part 4, immediately preceding, and polycarboxy acids, particularly dicarboxy acids such as adipic acid, phthalic acid, or anhydride, succinic acid, diglycolic acid, sebacic acid, azelaic acid, aconitic acid, maleic acid or anhydride, citraconic acid or anhydride, maleic acid or anhydride adducts, as obtained by the Diels-Alder reaction from products such as maleic anhydride, and cyclopentadiene. Such acids should be heat-stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids, and particularly dicarboxy acids, having not over 8 carbon atoms.

In the present instance the polyhydroxylated reactants have at least two or more hydroxyl radicals. Indeed, assuming the resin unit has three or more phenolic hydroxyls which always would be true, oxyalkylation necessarily must yield at least three reactive hydroxyl radicals except in the very early stages or very low limit of oxyalkylation as described in the preceding section. If glycide or methylglycide were used the number of hydroxyl radicals would be larger. Since the phenolic resin itself may have several phenolic hydroxyls there is further opportunity for a multiplicity of hydroxyl radicals in the reactant which serves as an alcohol in the esterification step. The presence of a basic nitrogen atom involves some added complication due to its inherent salt-forming character. If several basic nitrogen atoms happened to be present in a polyhydroxylated reactant the same would be true to a greater degree. In any condensate of the general type herein described, and also in the type of condensate described in my co-pending applications, Serial Nos. 321,031, 321,032, 321,033, and 321,034, invariably there must be at least two basic nitrogen atoms.

It is my preference always to add enough of a strong acid, such as hydrochloric acid or sulfuric acid, so as to be stoichiometrically equivalent to the basicity of the alkaline catalyst used in oxyalkylation. Also, I prefer to use a slight additional excess and if need be sufficient to combine with the nitrogen basicity of the reactant, and if needed an excess over and above this amount. At the worst, if there is no excess, some of the polycarboxy acid reactant may be wasted in a neutralizing reaction rather than an esterification reaction. Such salt may, however, convert into an ester. However, it is my preference to use the oxyalkylated derivatives in which the original resin condensate contributes a comparatively small fraction and thus the basicity may in itself either be insignificant or comparatively small from a neutralization standpoint. With these facts in mind one can prepare the esters in substantially the same way as if one were esterifying polyhydroxylated reactants free from any nitrogen atom, particularly any basic nitrogen atom.

As stated in U. S. Patent No. 2,602,060 dated July 1, 1952, to De Groote, the production of esters, including acidic esters (fractional esters) from polycarboxy acids and glycols or other hydroxylated compounds, is well known. Needless to say, various compounds may be used, such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950, to De Groote and Keiser, and particularly with one more opening to permit the use of a porous spreader if hydrochloric acid gas is to be used as a catalyst. Such device or absorption spreader consists of minute Alundum thimbles which are connected to a glass tube. One can add a sulfonic acid such as paratoluene sulfonic acid as a catalyst. There is some objection to this because in some instances there is some evidence that this acid catalyst tends to decompose or rearrange polyoxyalkylated compounds, and particularly likely to do so if the esterification temperature is too high. In the case of polycarboxy acids such as diglycolic which is strongly acidic, there is no need to add any catalyst.

In the case of highly oxyalkylated compounds where nitrogen basicity can be ignored, or almost ignored, the use of hydrochloric gas has one advantage over paratoluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever and to insure complete dryness of the oxyalkylated amine-modified phenol-aldehyde resin as described in the final procedure just preceding Table VII.

The products obtained in Part 4, preceding, may contain a basic catalyst. Using highly oxyalkylated compounds, as a general procedure I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage, needless to say, a second filtration may be required.

In any event, the product resulting from the pretreatment is apt to be neutral or basic and particularly slightly basic. If a little more acid is used it may even be acidic. My preference is, as pointed out previously, that the product be neutral or slightly acidic. Oddly enough, if all the basicity is due to a basic nitrogen atom or more than one basic nitrogen atom since the resin condensate must invariably and inevitably have at least two basic nitrogen atoms, I have found that in stages of modest or heavy oxyalkylation the final product indicates that the basicity has been greatly reduced, possibly due to the hydroxylation or some other effect. Compare, for example, the reduced basicity of triethanolamine with that of ammonia. As previously noted, at the worse if all the catalyst has been removed or neutralized, a little of the polycarboxy reactant may be lost.

Considering the resin condensates which are subjected to oxyalkylation, not only in the present application but also in the four co-pending applications, Serial Nos. 321,031, 321,032, 321,033, and 321,034, it is apparent the situation becomes further complicated by the fact that an amine having one or more basic nitrogen atoms, or even a cyclic structure, also may have hydroxyl radicals and possibly secondary nitrogen groups susceptible to acylation. Such amino groups are apt to disappear for obvious reasons on oxyalkylation, particularly after the initial step of oxyalkylation. Thus, what is said herein in regard to esterification applies with equal force and effect substantially to all hydroxylated compounds described, not only in this application but also in the four co-pending applications noted immediately above.

In any event, such oxyalkylated derivative described in Part Four is then diluted further with sufficient xylene, decalin, petroleum solvent, or the like, so that one has obtained approximately a 65% solution. To this solution there is added a polycarboxylated reactant, as previously described, such as phthalic anhydride, succinic acid, or anhydride, diglycolic acid, etc., in the ratio of one mole of polycarboxy reactant for each available hydroxyl radical. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycolic acid for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxyalkylated end-product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the dehydrated sodium sulfate and probably the sodium chloride formed. The clear, somewhat viscous straw-colored amber liquid, or reddish-amber liquid, so obtained may contain a small amount of sodium sulfate or sodium chloride, but in any event, is perfectly acceptable for esterification in the manner described, subject to what has been said previously in regard to basicity due to the basic nitrogen atoms present.

It is to be pointed out that the products here described are not polyesters in the sense that there is a plurality of both hydroxy reactant radicals and acid radicals; the product is characterized by having only one hydroxy reactant radical.

In some instances and, in fact, in many instances, I have found that in spite of the dehydration methods employed above a mere trace of water still comes through, and that this mere trace of water certainly interferes with the acetyl or hydroxyl value determination, at least when a number of conventional procedures are used and may retard esterification particularly where there is no sulfonic acid or hydrochloric acid present as a catalyst. Therefore, I have preferred to use the following procedure: I have employed about 200 grams of the hydroxylated compound as described in Part Four, preceding; I have added about 200 grams of benzene, and then refluxed this mixture in the glass resin pot using a phase-separating trap until the benzene carried out all the water present as water of solution or the equivalent. Ordinarily this refluxing temperature is apt to be in the neighborhood of 130° C. to possibly 150° C. When all this water or moisture has been removed I also withdraw approximately 100 grams or a little less benzene and then add the required amount of a carboxy reactant and also about 50 grams of a high boiling aromatic petroleum solvent. These solvents are sold by various oil refineries and, as far as solvent effect, act as if they were almost completely aromatic in character. Typical distillation data in the particular type I have employed and found very satisfactory are the following:

| | |
|---|---|
| I. B. P., 140° C. | 50 ml., 242° C. |
| 5 ml., 200° C. | 55 ml., 244° C. |
| 10 ml., 209° C. | 60 ml., 248° C. |
| 15 ml., 215° C. | 65 ml., 252° C. |
| 20 ml., 216° C. | 70 ml., 252° C. |
| 25 ml., 220° C. | 75 ml., 260° C. |
| 30 ml., 225° C. | 80 ml., 264° C. |
| 35 ml., 230° C. | 85 ml., 270° C. |
| 40 ml., 234° C. | 90 ml., 280° C. |
| 45 ml., 237° C. | 95 ml., 307° C. |

After this material is added, refluxing is continued and, of course, is at a high temperature, to wit, about 160° to 170° C. If the carboxy reactant is an anhydride, needless to say, no water of reaction appears; if the carboxy reactant is an acid, water of reaction should appear and should be eliminated at the above reaction temperature. If it is not eliminated, I simply separate out another 5 to 10 cc. of benzene by means of the phase-separating trap and thus raise the temperature to 180° or 190° C., or even to 200° C., if need be. My preference is not to go above 200° C.

The use of such solvent is extremely satisfactory, provided one does not attempt to remove the solvent subsequently except by vacuum distillation, and provided there is no objection to a little residue. Actually, when these materials are used for a purpose such as demulsification the solvent might just as well be allowed to remain. If the solvent is to be removed by distillation, and particularly vacuum distillation, then the high boiling aromatic petroleum solvent might well be replaced by some more expensive solvent such as decalin or an alkylated decalin, which has a rather definite or close range boiling point. The removal of solvent, of course, is purely a conventional procedure and requires no elaboration.

Merely by way of illustration, the following examples use a simple procedure, to wit; the hydroxylated compound is mixed with an equal weight of xylene and refluxed at approximately 190° C., or thereabouts for 12 hours or somewhat longer. After this period of time it has been found that in almost every instance the reaction is complete. Water, if formed, is separated by the usual trap arrangement. Of course, when anhydride is used there is little or no formation of water.

*Example 1e*

The hydroxylated compound was the one previously identified as Example 6c. The amount used was 200 grams. The amount of xylene used was 207.6 grams. The polycarboxy reactant was diglycolic acid and the amount used was 8.81 grams. The esterification time was almost 16 hours. The amount of water out at the end of this period was 1.2 grams. The same procedure was followed in a number of other examples, all of which are included in Table VII, following.

TABLE VII

| Ex. No. acid ester | Ex. No. of cmpd. | Theo. m. w. of h. c. | Theo. hyd. val. of h. c. | Amt. of Hyd. cmpd. grs. | Polycarboxy reactant | Amt. of polycarb. reactant, grs. | Solvent (xylene), grs. | Max. esterification, temp., °C. | Time of esterification, hrs. | Water out, cc. |
|---|---|---|---|---|---|---|---|---|---|---|
| 1e | 6c | 10,626 | 18.2 | 200 | Diglycolic acid | 8.81 | 207.6 | 200 | 15.5 | 1.2 |
| 2e | 6c | 10,626 | 18.2 | 200 | Phthalic anhydride | 9.75 | 209.8 | 204 | 13 | |
| 3e | 6c | 10,626 | 18.2 | 200 | Maleic anhydride | 6.45 | 206.5 | 193 | 11 | |
| 4e | 6c | 10,626 | 18.2 | 200 | Aconitic acid | 11.5 | 210.3 | 195 | 12 | 1.2 |
| 5e | 7c | 12,144 | 15.9 | 200 | Diglycolic acid | 7.71 | 206.7 | 202 | 14 | 1.0 |
| 6e | 7c | 12,144 | 15.9 | 200 | Phthalic anhydride | 8.53 | 208.5 | 201 | 14 | |
| 7e | 7c | 12,144 | 15.9 | 200 | Maleic anhydride | 5.65 | 205.7 | 195 | 12 | |
| 8e | 7c | 12,144 | 15.9 | 200 | Adipic acid | 8.4 | 207.4 | 198 | 12 | 1.0 |
| 9e | 8c | 13,662 | 14.1 | 200 | Diglycolic acid | 6.36 | 205.4 | 205 | 14 | .92 |
| 10e | 8c | 13,662 | 14.1 | 200 | Phthalic anhydride | 7.59 | 207.6 | 203 | 12 | |
| 11e | 8c | 13,662 | 14.1 | 200 | Maleic anhydride | 5.01 | 205.0 | 200 | 9 | |
| 12e | 8c | 13,662 | 14.1 | 200 | Succinic anhydride | 5.12 | 205.1 | 198 | 10 | |
| 13e | 14c | 10,822 | 16.8 | 200 | Diglycolic acid | 8.64 | 207.4 | 203 | 15 | 1.2 |
| 14e | 14c | 10,822 | 16.8 | 200 | Phthalic anhydride | 9.55 | 209.6 | 199 | 14 | |
| 15e | 14c | 10,822 | 16.8 | 200 | Maleic anhydride | 6.34 | 206.3 | 195 | 10.5 | |
| 16e | 14c | 10,822 | 16.8 | 200 | Aconitic acid | 11.25 | 210.1 | 197 | 12 | 1.2 |
| 17e | 15c | 12,368 | 15.6 | 200 | Diglycolic acid | 7.58 | 206.6 | 205 | 14 | 1.0 |
| 18e | 15c | 12,368 | 15.6 | 200 | Phthalic anhydride | 8.36 | 208.4 | 203 | 15 | |
| 19e | 15c | 12,368 | 15.6 | 200 | Maleic anhydride | 5.54 | 205.5 | 198 | 10.5 | |
| 20e | 15c | 12,368 | 15.6 | 200 | Adipic acid | 8.25 | 208.3 | 203 | 12 | 1.0 |
| 21e | 16c | 13,914 | 13.9 | 200 | Diglycolic acid | 6.86 | 206.0 | 209 | 15 | .9 |
| 22e | 16c | 13,914 | 13.9 | 200 | Phthalic anhydride | 7.6 | 207.6 | 207 | 12 | |
| 23e | 16c | 13,914 | 13.9 | 200 | Maleic anhydride | 4.93 | 204.9 | 199 | 10 | |
| 24e | 16c | 13,914 | 13.9 | 200 | Succinic anhydride | 5.13 | 205.1 | 195 | 10 | |
| 25e | 46c | 13,662 | 14.1 | 200 | Diglycolic acid | 6.85 | 206 | 209 | 16 | .9 |
| 26e | 46c | 13,662 | 14.1 | 200 | Phthalic anhydride | 7.58 | 207.6 | 211 | 15 | |
| 27e | 46c | 13,662 | 14.1 | 200 | Maleic anhydride | 5.02 | 205 | 202 | 11 | |
| 28e | 46c | 13,662 | 14.1 | 200 | Aconitic acid | 8.9 | 208 | 207 | 13 | .9 |
| 29e | 47c | 16,698 | 11.6 | 200 | Diglycolic acid | 5.64 | 204.8 | 210 | 16 | .8 |
| 30e | 47c | 16,698 | 11.6 | 200 | Phthalic anhydride | 6.22 | 206.2 | 214 | 17 | |
| 31e | 47c | 16,698 | 11.6 | 200 | Maleic anhydride | 4.12 | 204.1 | 206 | 13 | |
| 32e | 47c | 16,698 | 11.6 | 200 | Adipic acid | 6.14 | 205.3 | 209 | 16 | .8 |
| 33e | 48c | 18,216 | 10.6 | 200 | Diglycolic acid | 5.03 | 204.3 | 215 | 13 | .7 |
| 34e | 48c | 18,216 | 10.6 | 200 | Phthalic anhydride | 5.55 | 205.6 | 212 | 15 | |
| 35e | 48c | 18,216 | 10.6 | 200 | Maleic anhydride | 3.75 | 203.8 | 202 | 10 | |
| 36e | 48c | 18,216 | 10.6 | 200 | Succinic anhydride | 3.83 | 203.8 | 205 | 10 | |
| 37e | 54c | 13,914 | 13.85 | 200 | Diglycolic acid | 6.75 | 205.9 | 208 | 12.5 | .9 |
| 38e | 54c | 13,914 | 13.85 | 200 | Phthalic anhydride | 7.45 | 207.5 | 207 | 12.5 | |
| 39e | 54c | 13,914 | 13.85 | 200 | Maleic anhydride | 4.94 | 204.9 | 199 | 9 | |
| 40e | 54c | 13,914 | 13.85 | 200 | Aconitic acid | 8.75 | 207.9 | 202 | 13 | .9 |
| 41e | 55c | 17,006 | 11.3 | 200 | Diglycolic acid | 5.51 | 204.8 | 202 | 13 | .74 |
| 42e | 55c | 17,006 | 11.3 | 200 | Phthalic anhydride | 6.1 | 206.1 | 199 | 15 | |
| 43e | 55c | 17,006 | 11.3 | 200 | Maleic anhydride | 4.03 | 204 | 188 | 12 | |
| 44e | 55c | 17,006 | 11.3 | 200 | Adipic acid | 7.16 | 206.4 | 193 | 12 | .74 |
| 45e | 56c | 18,552 | 10.4 | 200 | Diglycolic acid | 5.05 | 204.35 | 200 | 13 | .7 |
| 46e | 56c | 18,552 | 10.4 | 200 | Phthalic anhydride | 5.58 | 205.6 | 198 | 12 | |
| 47e | 56c | 18,552 | 10.4 | 200 | Maleic anhydride | 3.70 | 203.7 | 191 | 10 | |
| 48e | 56c | 18,552 | 10.4 | 200 | Succinic anhydride | 3.77 | 203.8 | 185 | 10 | |
| 49e | 6d | 9,108 | 21.2 | 200 | Diglycolic acid | 10.3 | 209 | 185 | 12 | 1.3 |
| 50e | 6d | 9,108 | 21.2 | 200 | Phthalic anhydride | 11.4 | 211.4 | 188 | 13 | |
| 51e | 6d | 9,108 | 21.2 | 200 | Maleic anhydride | 7.52 | 207.5 | 179 | 7.5 | |
| 52e | 6d | 9,108 | 21.2 | 200 | Aconitic acid | 13.4 | 212.1 | 183 | 9 | 1.3 |
| 53e | 7d | 10,626 | 18.1 | 200 | Diglycolic acid | 8.84 | 207.6 | 190 | 12 | 1.2 |
| 54e | 7d | 10,626 | 18.1 | 200 | Phthalic anhydride | 9.75 | 209.8 | 189 | 12 | |
| 55e | 7d | 10,626 | 18.1 | 200 | Maleic anhydride | 6.45 | 206.5 | 179 | 10 | |
| 56e | 7d | 10,626 | 18.1 | 200 | Adipic acid | 9.6 | 208.4 | 182 | 11 | 1.2 |
| 57e | 8d | 12,144 | 15.9 | 200 | Diglycolic acid | 7.7 | 206.7 | 192 | 12 | 1.0 |
| 58e | 8d | 12,144 | 15.9 | 200 | Phthalic anhydride | 8.5 | 208.5 | 190 | 13 | |

TABLE VII—Continued

| Ex. No. acid ester | Ex. No. of cmpd. | Theo. m. w. of h. c. | Theo. hyd. val. of h. c. | Amt. of hyd. cmpd. grs. | Polycarboxy reactant | Amt. of polycarb. reactant, grs. | Solvent (xylene), grs. | Max. esterification, temp., °C. | Time of esterification, hrs. | Water out, cc. |
|---|---|---|---|---|---|---|---|---|---|---|
| 59e | 8d | 12,144 | 15.9 | 200 | Maleic anhydride | 5.65 | 205.7 | 183 | 10 | |
| 60e | 8d | 12,144 | 15.9 | 200 | Succinic anhydride | 5.75 | 205.8 | 184 | 10 | |
| 61e | 22d | 17,879 | 10.8 | 200 | Diglycolic acid | 5.25 | 204.6 | 197 | 15 | .7 |
| 62e | 22d | 17,879 | 10.8 | 200 | Phthalic anhydride | 5.8 | 205.8 | 195 | 17 | |
| 63e | 22d | 17,879 | 10.8 | 200 | Maleic anhydride | 3.84 | 203.8 | 188 | 12 | |
| 64e | 22d | 17,879 | 10.8 | 200 | Aconitic acid | 6.82 | 206.1 | 192 | 13 | .7 |
| 65e | 23d | 18,652 | 10.35 | 200 | Diglycolic acid | 5.03 | 204.3 | 202 | 15 | .7 |
| 66e | 23d | 18,652 | 10.35 | 200 | Phthalic anhydride | 5.55 | 205.6 | 200 | 15 | |
| 67e | 23d | 18,652 | 10.35 | 200 | Maleic anhydride | 3.68 | 203.7 | 192 | 10 | |
| 68e | 23d | 18,652 | 10.35 | 200 | Adipic acid | 5.47 | 204.8 | 195 | 12 | .7 |
| 69e | 24d | 19,425 | 9.94 | 200 | Diglycolic acid | 4.83 | 204.2 | 205 | 15 | .65 |
| 70e | 24d | 19,425 | 9.94 | 200 | Phthalic anhydride | 5.33 | 205.3 | 202 | 16 | |
| 71e | 24d | 19,425 | 9.94 | 200 | Maleic anhydride | 3.52 | 203.5 | 195 | 13 | |
| 72e | 24d | 19,425 | 9.94 | 200 | Succinic anhydride | 3.6 | 203.6 | 194 | 8 | |

PART 6

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing the present process the treating or demulsifying agent is employed in the conventional manner, well known to the art, described for example in Patent 2,626,929, dated January 27, 1953, Part 3, and reference is made thereto for a description of conventional procedures of demulsifying, including batch, continuous and down-the-hole demulsification, the process essentially involving introducing a small amount of demulsifier into a large amount of emulsion with adequate admixture, with or without the application of heat, and allowing the mixture to stratify.

In many instances the oxyalkylated products herein specified as demulsifiers can be conveniently used without dilution. However, they may be diluted as desired with any suitable solvent. For instance, by mixing 75 parts by weight of an oxyalkylated derivative, for example, the product of Example 61e with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

The products herein described may be used not only in diluted form, but also may be used admixed with some other chemical demulsifier. A mixture which illustrates such combination is the following:

Oxyalkylated derivative, for example, the product of Example 61e, 20%;

A cyclohexylamine salt of a polypropylated napthalene monosulfonic acid, 24%;

An ammonium salt of a polypropylated napthalene monosulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

Having thus described my invention, what I claim as new and desire to secure by Letters Patent is:

1. A process for breaking petroleum emulsions of the water-in-oil type characterized by subjecting the emulsion to the action of a demulsifier including synthetic hydrophile products; said synthetic hydrophile products being acidic fractional esters obtained by the manufacturing process of esterifying (A) an oxyalkylated amine-modified phenol-aldehyde resin condensate with (B) a polycarboxy acid; said oxyalkylated condensate being obtained by the process of first condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of tri-functional phenols; said phenol being of the formula

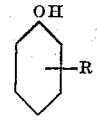

in which R is an aliphatic hydrocarbon radical having at least 4 and not more 24 carbon atoms and substituted in the 2,4,6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide; the ratio of polycarboxy acid reactant to oxyalkylated reactant being one mole of the former for each hydroxyl group present in the latter.

2. A process for breaking petroleum emulsions of the water-in-oil type characterized by subjecting the emulsion to the action of a demulsifier including synthetic hydrophile products; said synthetic hydrophile products being acidic fractional esters obtained by the manufacturing process of esterifying (A) an oxyalkylated amine-modified phenol-aldehyde resin condensate with (B) a polycarboxy acid; said oxyalkylated condensate being obtained by the process of first condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

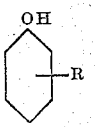

in which R is an aliphatic hydrocarbon radical having at least 4 and not more than 24 carbon atoms and substituted in the 2,4,6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a formaldehyde-derived methylene bridge connecting the amino nitrogen atom of reaction with a resin molecule; with the further proviso that the ratio of reactants be approximately 1,2 and 2 respectively; and with the final proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide; the ratio of polycarboxy acid reactant to oxyalkylated reactant being one mole of the former for each hydroxyl group present in the latter.

3. A process for breaking petroleum emulsions of the water-in-oil type characterized by subjecting the emulsion to the action of a demulsifier including synthetic hydrophile products; said synthetic hydrophile products being acidic fractional esters obtained by the manufacturing process of esterifying (A) an oxyalkylated amine-modified phenol-aldehyde resin condensate with (B) a polycarboxy acid; said oxyalkylated condensate being obtained by the process of first condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

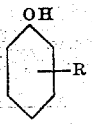

in which R is an aliphatic hydrocarbon radical having at least 4 and not more than 24 carbon atoms and substituted in the 2,4,6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule; by virtue of a formaldehyde-derived methylene bridge connecting the amino nitrogen atom of reaction with a resin molecule; with the added proviso that the ratio of reactants be approximately 1,2 and 2, respectively; with the further proviso that said procedure involve the use of a solvent; and with the final proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide; the ratio of polycarboxy acid reactant to oxyalkylated reactant being one mole of the former for each hydroxyl group present in the latter.

4. A process for breaking petroleum emulsions of the water-in-oil type characterized by subjecting the emulsion to the action of a demulsifier including synthetic hydrophile products; said synthetic hydrophile products being acidic fractional esters obtained by the manufacturing process of esterifying (A) an oxyalkylated amine-modified phenol-aldehyde resin condensate with (B) a polycarboxy acid; said oxyalkylated condensate being obtained by the process of first condensing (a) an oxyalkylation-susceptible, fusible, non-oxygenated organic solvent-soluble, water-insoluble, low-stage phenol-formaldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and formaldehyde; said resin being derived by reaction between a difunctional monohydric phenol and formaldehyde; said resin being formed in the substantial absence of trifunctional phenols; said phenol being of the formula

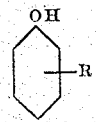

in which R is an aliphatic hydrocarbon radical having at least 4 and not more than 24 carbon atoms and substituted in the 2,4,6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule by virtue of a formaldehyde-derived methylene bridge connecting the amino nitrogen atom of reaction with a resin molecule; with the added proviso that the ratio of reactants be approximately 1,2 and 2, respectively; with the further proviso that said procedure involve the use of a solvent; and with the final proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide; the ratio of polycarboxy acid reactant to oxyalkylated reactant being one mole of the former for each hydroxyl group present in the latter.

5. A process for breaking petroleum emulsions of the water-in-oil type characterized by subjecting the emulsion to the action of a demulsifier including synthetic hydrophile products; said synthetic hydrophile products being acidic fractional esters obtained by the manufacturing process of esterifying (A) an oxyalkylated amine-modified phenol-aldehyde resin condensate with (B) a polycarboxy acid; said oxyalkylated condensate being obtained by the process of first condensing (a) an oxyalkylation-susceptible, fusible, non-oxygenated organic solvent-soluble, water-insoluble, low-stage phenol-formaldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

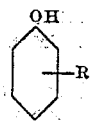

in which R is an aliphatic hydrocarbon radical having at least 4 and not more than 14 carbon atoms and substituted in the 2,4,6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule by virtue of a formaldehyde-derived methylene bridge connecting the amino nitrogen atom of reaction with a resin molecule; with the added proviso that the ratio of reactants be approximately 1,2 and 2, respectively; with the further proviso that said procedure involve the use of a solvent; and with the final proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide; the ratio of polycarboxy acid reactant to oxyalkylated reactant being one mole of the former for each hydroxyl group present in the latter.

6. A process for breaking petroleum emulsions of the water-in-oil type characterized by subjecting the emulsion to the action of a demulsifier including synthetic hydrophile products; said synthetic hydrophile products being acidic fractional esters obtained by the manufacturing process of esterifying (A) an oxyalkylated amine-modified phenol-aldehyde resin condensate with (B) a polycarboxy acid; said oxyalkylated condensate being obtained by the process of first condensing (a) an oxyalkylation-susceptible, fusible, non-oxygenated organic solvent-soluble, water-insoluble, low-stage phenol-formaldehyde resin having an average molecular weight corresponding to at least 3 and not over 5 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

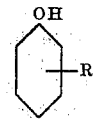

in which R is an aliphatic hydrocarbon radical having at least 4 and not more than 14 carbon atoms and substituted in the 2,4,6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule by virtue of a formaldehyde-derived methylene bridge connecting the amino nitrogen atom of reaction with a resin molecule; with the added proviso that the ratio of reactants be approximately 1,2 and 2, respectively; with the further proviso that said procedure involve the use of a solvent; and with the final proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide; the ratio of polycarboxy acid reactant to oxyalkylated reactant being one mole of the former for each hydroxyl group present in the latter.

7. A process for breaking petroleum emulsions of the water-in-oil type characterized by subjecting the emulsion to the action of a demulsifier including synthetic hydrophile products; said synthetic hydrophile products being acidic fractional esters obtained by the manufacturing process of esterifying (A) an oxyalkylated amine-modified phenol-aldehyde resin condensate with (B) a polycarboxy acid; said oxyalkylated condensate being obtained by the process of first condensing (a) an oxyalkylation-susceptible, fusible, non-oxygenated organic solvent-soluble, water-insoluble, low-stage phenol-formaldehyde resin having an average molecular weight corresponding to at least 3 and not over 5 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

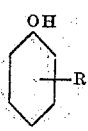

in which R is an aliphatic hydrocarbon radical having at least 4 and not more than 14 carbon atoms and substituted in the 2,4,6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature above the boiling point of water and below 150° C., with the proviso that the condensation reaction be conducted so as to produce a significant portion of the resultant in which each of the three reactants have contributed part of the ultimate molecule by virtue of a formaldehyde-derived methylene bridge connecting the amino nitrogen atom of reaction with a resin molecule; with the added proviso that the ratio of reactants be approximately 1,2 and 2, respectively; with the further proviso that said procedure involve the use of a solvent; and with the final proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide; the ratio of polycarboxy acid reactant to oxyalkylated reactant being one mole of the former for each hydroxyl group present in the latter.

8. A process for breaking petroleum emulsions of the water-in-oil type characterized by subjecting the emulsion to the action of a demulsifier including synthetic hydrophile products; said synthetic hydrophile products being acidic fractional esters obtained by the manufacturing process of esterifying (A) an oxyalkylated amine-modified phenol-aldehyde resin condensate with (B) a polycarboxy acid; said oxyalkylated condensate being obtained by the process of first condensing (a) an oxyalkylation-susceptible, fusible, non-oxygenated organic solvent-soluble, water-insoluble, low-stage phenol-formaldehyde resin having an average molecular weight corresponding to at least 3 and not over 5 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

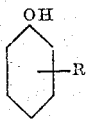

in which R is a para-substituted aliphatic hydrocarbon radical having at least 4 and not more than 14 carbon atoms; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature above the boiling point of water and below 150° C., with the proviso that the condensation reaction be conducted so as to produce a significant portion of the resultant in which each of the three reactants have contributed part of the ultimate molecule by virtue of a formaldehyde-derived methylene bridge connecting the amino nitrogen atom of reaction with a resin molecule; with the added proviso that the ratio of reactants be approximately 1,2 and 2, respectively; with the further proviso that said procedure involve the use of a solvent; and with the final proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide; the ratio of polycarboxy acid reactant to oxyalkylated reactant being one mole of the former for each hydroxyl group present in the latter.

9. The process of claim 1 wherein the oxyalkylation step is limited to the use of both ethylene oxide and propylene oxide in combination, and the esterification step is limited to the use of a dicarboxy acid having not over 8 carbon atoms.

10. The process of claim 2 wherein the oxyalkylation step is limited to the use of both ethylene oxide and propylene oxide in combination, and the esterification step is limited to the use of a dicarboxy acid having not over 8 carbon atoms.

11. The process of claim 3 wherein the oxyalkylation step is limited to the use of both ethylene oxide and propylene oxide in combination, and the esterification step is limited to the use of a dicarboxy acid having not over 8 carbon atoms.

12. The process of claim 4 wherein the oxyalkylation step is limited to the use of both ethylene oxide and propylene oxide in combination, and the esterification step is limited to the use of a dicarboxy acid having not over 8 carbon atoms.

13. The process of claim 5 wherein the oxyalkylation step is limited to the use of both ethylene oxide and propylene oxide in combination, and the esterification step is limited to the use of a dicarboxy acid having not over 8 carbon atoms.

14. The process of claim 6 wherein the oxyalkylation step is limited to the use of both ethylene oxide and propylene oxide in combination, and the esterification step is limited to the use of a dicarboxy acid having not over 8 carbon atoms.

15. The process of claim 7 wherein the oxyalkylation step is limited to the use of both ethylene oxide and propylene oxide in combination, and the esterification step is limited to the use of a dicarboxy acid having not over 8 carbon atoms.

16. The process of claim 8 wherein the oxyalkylation step is limited to the use of both ethylene oxide and propylene oxide in combination, and the esterification step is limited to the use of a dicarboxy acid having not over 8 carbon atoms.

17. The process of claim 1 with the proviso that the hydrophile properties of the product obtained by oxyalkylation of the condensate prior to esterification employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

18. The process of claim 2 with the proviso that the hydrophile properties of the product obtained by oxyalkylation of the condensate prior to esterification employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

19. The process of claim 3 with the proviso that the hydrophile properties of the product obtained by oxyalkylation of the condensate prior to esterification employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

20. The process of claim 4 with the proviso that the hydrophile properties of the product obtained by oxyalkylation of the condensate prior to esterification employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

21. The process of claim 5 with the proviso that the hydrophile properties of the product obtained by oxyalkylation of the condensate prior to esterification employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

22. The process of claim 6 with the proviso that the hydrophile properties of the product obtained by oxyalkylation of the condensate prior to esterification employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

23. The process of claim 7 with the proviso that the hydrophile properties of the product obtained by oxyalkylation of the condensate prior to esterification employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

24. The process of claim 8 with the proviso that the hydrophile properties of the product obtained by oxyalkylation of the condensate prior to esterification employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

25. The process of claim 1 wherein the oxyalkylation step is limited to the use of both ethylene oxide and propylene oxide in combination, and the esterification step is limited to the use of a dicarboxy acid having not over eight carbon atoms; and with the proviso that the hydrophile properties of the product obtained by oxyalkylation of the condensate prior to esterification employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

26. The process of claim 2 wherein the oxyalkylation step is limited to the use of both ethylene oxide and propylene oxide in combination, and the esterification step is limited to the use of a dicarboxy acid having not over eight carbon atoms; and with the proviso that the hydrophile properties of the product obtained by oxyalkylation of the condensate prior to esterification employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

27. The process of claim 3 wherein the oxyalkylation step is limited to the use of both ethylene oxide and propylene oxide in combination, and the esterification step is limited to the use of a dicarboxy acid having not over eight carbon atoms; and with the proviso that the hydrophile properties of the product obtained by oxyalkylation of the condensate prior to esterification employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

28. The process of claim 4 wherein the oxyalkylation step is limited to the use of both ethylene oxide and propylene oxide in combination, and the esterification step is limited to the use of a dicarboxy acid having not over eight carbon atoms; and with the proviso that the hydrophile properties of the product obtained by oxyalkylation of the condensate prior to esterification employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

29. The process of claim 5 wherein the oxyalkylation step is limited to the use of both ethylene oxide and propylene oxide in combination, and the esterification step is limited to the use of a dicarboxy acid having not over eight carbon atoms; and with the proviso that the hydrophile properties of the product obtained by oxyalkylation of the condensate prior to esterification employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

30. The process of claim 6 wherein the oxyalkylation step is limited to the use of both ethylene oxide and propylene oxide in combination, and the esterification step is limited to the use of a dicarboxy acid having not over eight carbon atoms; and with the proviso that the hydrophile properties of the product obtained by oxyalkylation of the condensate prior to esterification employed in the form a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

31. The process of claim 7 wherein the oxyalkylation step is limited to the use of both ethylene oxide and propylene oxide in combination, and the esterification step is limited to the use of a dicarboxy acid having not over eight carbon atoms; and with the proviso that the hydrophile properties of the product obtained by oxyalkylation of the condensate prior to esterification employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

32. The process of claim 8 wherein the oxyalkylation step is limited to the use of both ethylene oxide and propylene oxide in combination, and the esterification step is limited to the use of a dicarboxy acid having not over eight carbon atoms; and with the proviso that the hydrophile properties of the product obtained by oxyalkylation of the condensate prior to esterification employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

References Cited in the file of this patent

UNITED STATES PATENTS

| Number | Name | Date |
|---|---|---|
| 2,031,557 | Bruson | Feb. 18, 1936 |
| 2,454,544 | Bock et al. | Nov. 23, 1948 |
| 2,542,012 | DeGroote et al. | Feb. 20, 1951 |